US011602987B2

(12) United States Patent
Rike et al.

(10) Patent No.: US 11,602,987 B2
(45) Date of Patent: *Mar. 14, 2023

(54) METHODS AND SYSTEMS FOR ALTERNATIVE FUEL CONTAINER SUPPORT

(71) Applicant: WORTHINGTON INDUSTRIES, INC., Columbus, OH (US)

(72) Inventors: James B. Rike, Mooresville, IN (US); Steven J. Tiede, Clearfield, UT (US); Michael A. Pintz, Fairview Park, OH (US)

(73) Assignee: WORTHINGTON INDUSTRIES INC., Columbus, OH (US)

( * ) Notice: Subject to any disclaimer, the term of this patent is extended or adjusted under 35 U.S.C. 154(b) by 1129 days.

This patent is subject to a terminal disclaimer.

(21) Appl. No.: 16/212,811

(22) Filed: Dec. 7, 2018

(65) Prior Publication Data

US 2019/0105986 A1 Apr. 11, 2019

Related U.S. Application Data

(63) Continuation of application No. 15/879,816, filed on Jan. 25, 2018, now Pat. No. 10,183,576, which is a (Continued)

(51) Int. Cl.
*B60K 15/07* (2006.01)
*B60K 15/03* (2006.01)

(52) U.S. Cl.
CPC ........ *B60K 15/07* (2013.01); *B60K 15/03006* (2013.01)

(58) Field of Classification Search
CPC ............ B60K 15/07; B60K 15/03006; B60K 15/067; B60K 15/03; B60K 2015/03059;
(Continued)

(56) References Cited

U.S. PATENT DOCUMENTS 2,357,148 A * 8/1944 Turner ................ B60K 15/067
280/833
2,376,336 A * 5/1945 Brown ................ B60K 15/067
410/47
(Continued)

FOREIGN PATENT DOCUMENTS

CA 2809250 A1 * 5/2013 ............ B60K 15/07
CN 203752894 8/2014
(Continued)

OTHER PUBLICATIONS

PCT Written Opinion of the International Searching Authority for the International PCT Application No. PCT/US2017/033816, dated Jul. 17, 2017, 8 pages.
(Continued)

*Primary Examiner* — James A Shriver, II
*Assistant Examiner* — Conan D Duda
(74) *Attorney, Agent, or Firm* — Tucker Ellis LLP

(57) ABSTRACT

A support system is provided for a vehicle. The support system can include one or more bracket assemblies in which each includes a coupling member and a curved member in which the coupling member is affixed to a structure of the vehicle. A housing can be supported by the one or more bracket assemblies in which the housing encloses a container that stores a material such that the housing protects the container and the material. The support system provides movement between a length of the container so as to reduce deterioration of the support system.

18 Claims, 32 Drawing Sheets

Related U.S. Application Data continuation of application No. 15/601,269, filed on May 22, 2017, now Pat. No. 9,908,406.

(60) Provisional application No. 62/339,864, filed on May 21, 2016.

(58) Field of Classification Search
CPC .......... B60K 2015/03105; B60K 2015/03184; B60K 2015/03315; B60K 2015/03309
See application file for complete search history.

(56) References Cited

U.S. PATENT DOCUMENTS

| | | | |
|---|---|---|---|
| 2,410,182 A * | 10/1946 | Prior | B60K 15/067 248/315 |
| 2,902,240 A * | 9/1959 | La Belle | B60K 15/067 280/833 |
| 4,925,235 A * | 5/1990 | Fingerle | B62D 35/001 296/180.2 |
| 5,054,799 A * | 10/1991 | Fingerle | B62D 35/001 280/833 |
| 6,053,533 A * | 4/2000 | Osborn | B60K 15/067 280/830 |
| 6,059,252 A * | 5/2000 | Emmann | B60K 15/067 280/833 |
| 6,257,360 B1 | 7/2001 | Wozniak et al. | |
| 6,347,678 B1 * | 2/2002 | Osborn | B60K 15/067 180/68.5 |
| 6,634,321 B2 | 10/2003 | Hussain et al. | |
| 7,137,474 B2 * | 11/2006 | Yokote | F17C 13/084 248/500 |
| 7,305,836 B2 | 12/2007 | Egan | |
| 7,543,667 B2 * | 6/2009 | Hwang | H01M 8/04201 248/500 |
| 9,033,178 B2 | 5/2015 | White | |
| 9,057,483 B2 | 6/2015 | Espinosa-Loza et al. | |
| 9,193,261 B2 | 11/2015 | Sloan et al. | |
| 9,217,519 B2 | 12/2015 | Masters et al. | |
| 9,217,538 B2 | 12/2015 | Griffith et al. | |
| 9,234,625 B2 | 1/2016 | Sirosh | |
| 9,249,931 B2 | 2/2016 | Morales et al. | |
| 9,266,642 B2 | 2/2016 | Prakash et al. | |
| 2003/0042057 A1 * | 3/2003 | Kawazu | B62D 25/08 180/69.4 |
| 2003/0189334 A1 * | 10/2003 | Kawasaki | B60K 1/04 280/834 |
| 2005/0121572 A1 * | 6/2005 | Mascarenhas | B60K 15/067 280/760 |
| 2006/0006635 A1 * | 1/2006 | Sonderegger | B60K 15/067 280/830 |
| 2006/0032532 A1 * | 2/2006 | Suess | F17C 13/083 137/266 |
| 2006/0033322 A1 * | 2/2006 | Suess | B60K 15/07 280/830 |
| 2006/0061081 A1 * | 3/2006 | Kresse, Jr. | B60K 15/07 280/834 |
| 2006/0254560 A1 * | 11/2006 | Mann | F02B 19/10 123/305 |
| 2009/0152274 A1 * | 6/2009 | Shearn | B60K 15/063 220/564 |
| 2009/0309000 A1 * | 12/2009 | Guckes | B60K 15/07 248/309.1 |
| 2010/0307454 A1 * | 12/2010 | Ulrey | F02M 21/0224 123/445 |
| 2011/0259933 A1 * | 10/2011 | Dossow | B60K 15/067 224/538 |
| 2012/0080466 A1 * | 4/2012 | Schultheis | F17C 13/084 224/400 |
| 2012/0161430 A1 * | 6/2012 | Mulanon | F17C 13/084 280/834 |
| 2013/0104997 A1 * | 5/2013 | Harper | F17D 3/01 137/511 |
| 2013/0306644 A1 * | 11/2013 | Howell | B60K 15/073 29/428 |
| 2014/0061266 A1 * | 3/2014 | Milton | F17C 5/06 224/404 |
| 2014/0137953 A1 | 5/2014 | Gibb et al. | |
| 2014/0138173 A1 * | 5/2014 | Gibb | B60K 15/077 180/69.5 |
| 2014/0174159 A1 * | 6/2014 | Kim | F17C 13/12 73/49.3 |
| 2015/0060466 A1 * | 3/2015 | Lind | B65D 81/3809 220/560.11 |
| 2015/0096977 A1 * | 4/2015 | Sirosh | F02M 21/0296 248/313 |
| 2015/0372322 A1 * | 12/2015 | Shimoyana | B60K 15/063 429/515 |
| 2016/0082910 A1 * | 3/2016 | Sloan | B60K 15/063 293/128 |
| 2016/0096495 A1 * | 4/2016 | Sasaki | F16M 13/02 248/505 |
| 2016/0114674 A1 * | 4/2016 | Green | B60K 15/073 280/834 |
| 2016/0152379 A1 * | 6/2016 | Leonard | B60K 15/067 220/562 |
| 2016/0272104 A1 * | 9/2016 | Stahl | B60K 15/07 |
| 2016/0325620 A1 * | 11/2016 | Ballinger | B23K 15/0053 |
| 2017/0036536 A1 * | 2/2017 | Green | B66F 9/07 |
| 2017/0057348 A1 * | 3/2017 | Arold | B60K 15/067 |
| 2017/0080798 A1 * | 3/2017 | Van Der Linden | B62D 35/001 |
| 2017/0082240 A1 * | 3/2017 | Mlinaric | B60K 15/067 |
| 2017/0087979 A1 * | 3/2017 | Beauchaine | B60K 15/01 |
| 2017/0158050 A1 * | 6/2017 | Crist | B60K 15/063 |
| 2017/0240045 A1 * | 8/2017 | Ohashi | B60K 15/07 |
| 2017/0282710 A1 * | 10/2017 | Sloan | F17C 13/084 |
| 2017/0299769 A1 * | 10/2017 | Ohmi | G01V 11/002 |
| 2017/0326974 A1 * | 11/2017 | Shoji | B60K 15/067 |
| 2017/0361702 A1 * | 12/2017 | Scott | B63B 17/0027 |
| 2021/0388948 A1 * | 12/2021 | Fujii | B60K 15/07 |
| 2022/0009342 A1 * | 1/2022 | Grosch | B60K 15/03006 |
| 2022/0009347 A1 * | 1/2022 | Katano | B60K 15/03 |
| 2022/0266685 A1 * | 8/2022 | Godard | F17C 13/04 |

FOREIGN PATENT DOCUMENTS

| | | |
|---|---|---|
| EP | 2915687 | 12/2014 |
| WO | 199623721 | 8/1996 |
| WO | 200168446 | 9/2001 |
| WO | 2011152733 | 12/2011 |
| WO | 2013168080 | 11/2013 |
| WO | 2014149060 | 9/2014 |
| WO | 2015014517 | 2/2015 |
| WO | 2015175842 | 11/2015 |

OTHER PUBLICATIONS

PCT International Search Report for the International PCT Application No. PCT/US2017/033816, dated Jul. 17, 2017, 3 pages.
PCT International Preliminary Report of Patentability for the International PCT Application No. PCT/US2017/033816, dated Nov. 27, 2018, 9 pages.

* cited by examiner

METHODS AND SYSTEMS FOR ALTERNATIVE FUEL CONTAINER SUPPORT

CROSS-REFERENCE TO RELATED APPLICATIONS

This application is a continuation application of U.S. patent application Ser. No. 15/879,816 filed on Jan. 25, 2018 entitled "METHODS AND SYSTEMS FOR ALTERNATIVE FUEL CONTAINER SUPPORT." U.S. patent application Ser. No. 15/879,816 is a continuation application of U.S. patent application Ser. No. 15/601,269 filed on May 22, 2017 entitled "METHODS AND SYSTEMS FOR ALTERNATIVE FUEL CONTAINER SUPPORT." U.S. patent application Ser. No. 15/601,269 is a non-provisional of and claims the benefit of U.S. Provisional Patent Application Ser. No. 62/339,864 filed on May 21, 2016 entitled "METHODS AND SYSTEMS COMPRESSED NATURAL GAS (CNG) CONTAINER SUPPORT." The entireties of each of the aforementioned applications are incorporated herein by reference.

BACKGROUND

Technical Field

Embodiments of the subject matter disclosed herein relate to a container support for a vehicle, wherein an engine of the vehicle utilizes an alternative fuel as a fuel source, and in some examples a compressed gas as a fuel source. Some embodiments are directed to a support structure for a container of a vehicle that utilizes an alternative fuel as a fuel source, wherein the vehicle can utilize a combustible fuel engine, a battery powered engine, or a combination thereof.

Discussion of Art

It may be desirable to have an alternative fuel system and method that differs from those systems and methods that are currently available.

BRIEF DESCRIPTION

In an embodiment, a support system for a vehicle is provided that includes at least the following: one or more bracket assemblies that is configured to support a container within a housing, the bracket assembly includes a coupling member that couples to a chassis of a vehicle and a curved member that supports a portion of the housing; the container houses a compressed gas, the container has a first end and a second end opposite thereto; a threaded male portion on the first end that is coupled to a female portion on a first neck mount, wherein the threaded male portion mates with the female portion; the second end inserted into a second neck mount to enable movement based on a pressure change or a temperature change; a first inner plate coupled to the first neck mount located at the first end; a second inner plate coupled to the second neck mount located at the second end; the first inner plate and the second inner plate are coupled to an inside wall of the housing; a truss assembly coupled to a front side of the first inner plate; and the housing coupled to the curved member of the bracket assembly and the housing encases the container, the first neck mount, the second neck mount, the first inner plate, the second inner plate, and the truss assembly.

In an embodiment, a storage system for a vehicle is provided that includes at least the following: a housing having a first end and a second end opposite the first end and a thickness, the housing having a length between the first end and the second end; a container having a cylindrical shape is situated within the housing, the container houses a material, the container has a first end and a second end opposite thereto, the first end includes a neck and a valve 109 and the second end includes a pressure release device, wherein the valve is a two-way valve configured to receive the material and deliver the material to a vehicle via a tubing; a first neck mount configured to receive the neck, the first neck mount is coupled to a first inner plate positioned proximate to the first end of the housing; a second neck mount configured to receive the second end of the container, the second neck mount is coupled to a second inner plate positioned proximate to the second end of the housing; a truss assembly that is coupled to the first inner plate on a side that is opposite the first neck mount; one or more shield plates coupled to the ends of the housing to enclose the housing on the first end and the second end; and the housing is configured to be coupled to a frame of a vehicle such that the length of the housing is at least one of behind a cab of the vehicle or below a cab of the vehicle.

In an embodiment, a support system for a vehicle is provided that includes at least the following: a housing having a first end and a second end opposite the first end and a thickness, the housing having a length between the first end and the second end; a container having a cylindrical shape, the container houses a material, the container has a first end and a second end opposite thereto, the first end includes a neck and a valve and the second end includes a pressure release device, wherein the valve is a two-way valve configured to receive the material and deliver the material to a vehicle via a tubing; a first neck mount configured to receive the neck, the first neck mount is coupled to a first inner plate positioned proximate to the first end of the housing; a second neck mount configured to receive the second end of the container, the second neck mount is coupled to a second inner plate positioned proximate to the second end of the housing; a truss assembly that is coupled to the first inner plate on a side that is opposite the first neck mount; one or more shield plates coupled to the ends of the housing to enclose the housing on the first end and the second end; the housing configured to provide protection and enclose the container, the first neck mount, the first inner plate, the second neck mount, the second inner plate, and the truss assembly; and one or more bracket assemblies, wherein each bracket assembly includes a coupling member that couples to a chassis of a vehicle and a curved member that is coupled or supports an exterior of the housing.

These and other objects of this invention will be evident when viewed in light of the drawings, detailed description and appended claims.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
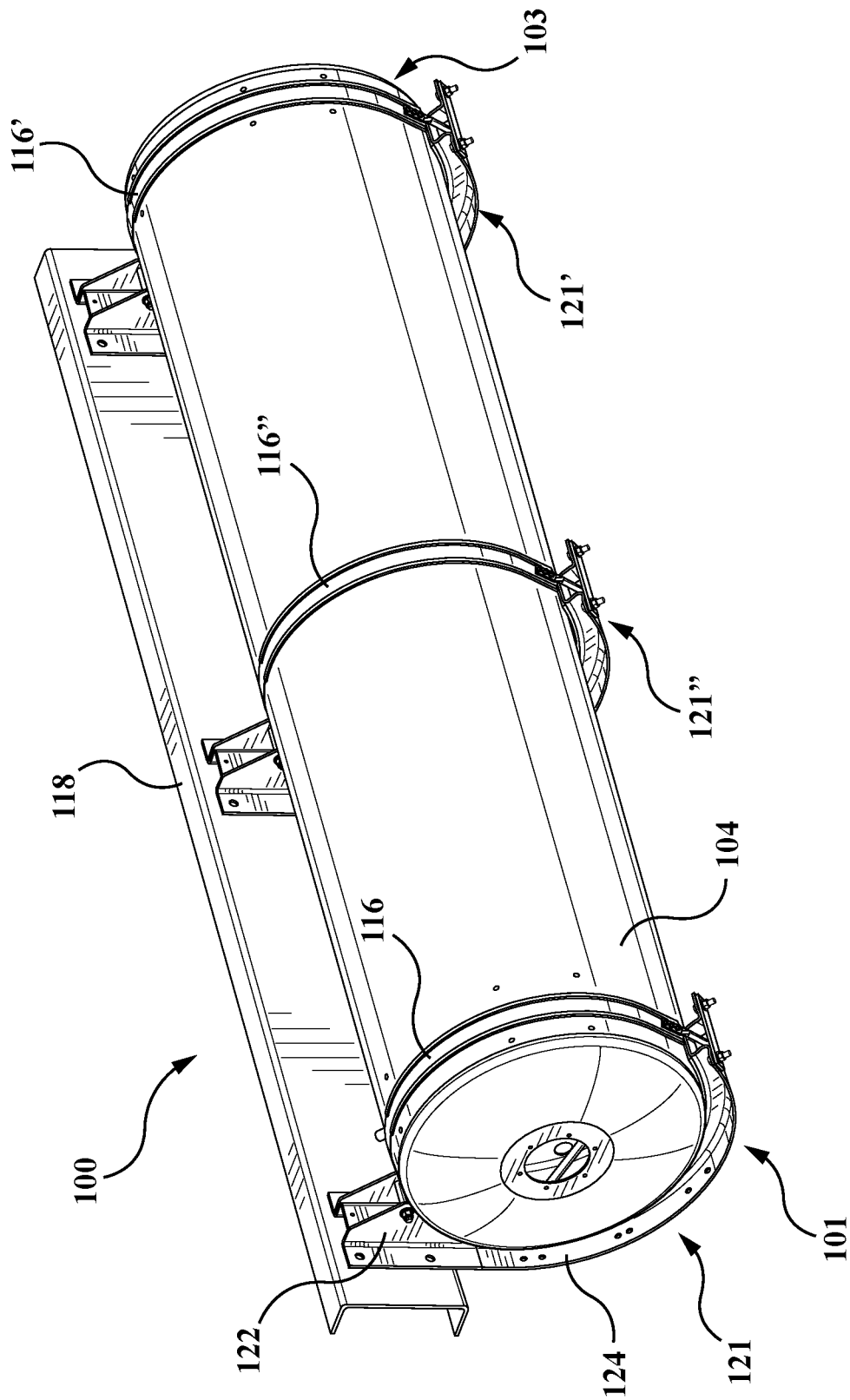
FIG. 1 is view of a support system coupled or supporting a housing.

Embodiments of the provided subject matter relate to methods and systems for a support system for a container housing a material used as a fuel source for a vehicle. A support structure can include a container that is coupled to a first neck mount on a first end and inserted into a second neck mount on a second end opposite the first end. The first neck mount can be coupled to a first inner plate, the first inner plate is coupled to a truss assembly. The second neck mount, opposite the first mount, can be coupled to a second inner plate. A housing can encase and house the container, the first neck mount, the second neck mount, the first inner plate, the second inner plate, and the truss assembly. A bracket assembly can include a coupling member and a curved member. The coupling member can be configured to be coupled to a chassis or structure on a vehicle. The curved member can be coupled to a portion of the coupling member and be configured to support and/or couple to the housing. Moreover, one or more strap members can attach to a portion of the coupling member and a portion of the curved member.

The support system can support or brace the container, wherein the container can house or store a material for a fuel source for a vehicle. The material can be used as a fuel source for a combustible fuel engine, an alternative fuel, or a fuel to power a device that powers or charges a battery used for the vehicle. In an embodiment, the material housed can be a compressed gas. In another embodiment, the material housed by the container can be compressed natural gas (CNG). The support system can support or brace one or more containers that house a portion of material and such containers can be vertically oriented, horizontally oriented, or a position in-between horizontal and vertical (in comparison to the ground). The support system can further include electrical and/or mechanical connective means in order to provide electrical and/or mechanical connectivity between the support system and the vehicle.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, a cement truck, a delivery truck, a tractor, a flat-bed truck, and the like. Moreover, a vehicle can be powered by combustible fuel (e.g., unleaded fuel, diesel fuel, compressed natural gas, compressed hydrogen, compressed gas, alternative fuel, among others) or a battery or electric motor. The term "container" as used herein can be defined as any cylinder, tank, housing, canister, and the like of any suitable material that can house or contain at least one of alternative fuels, renewable fuel sources, nonrenewable fuel sources, liquid fuel sources, or gas fuel sources.

Figure 2:
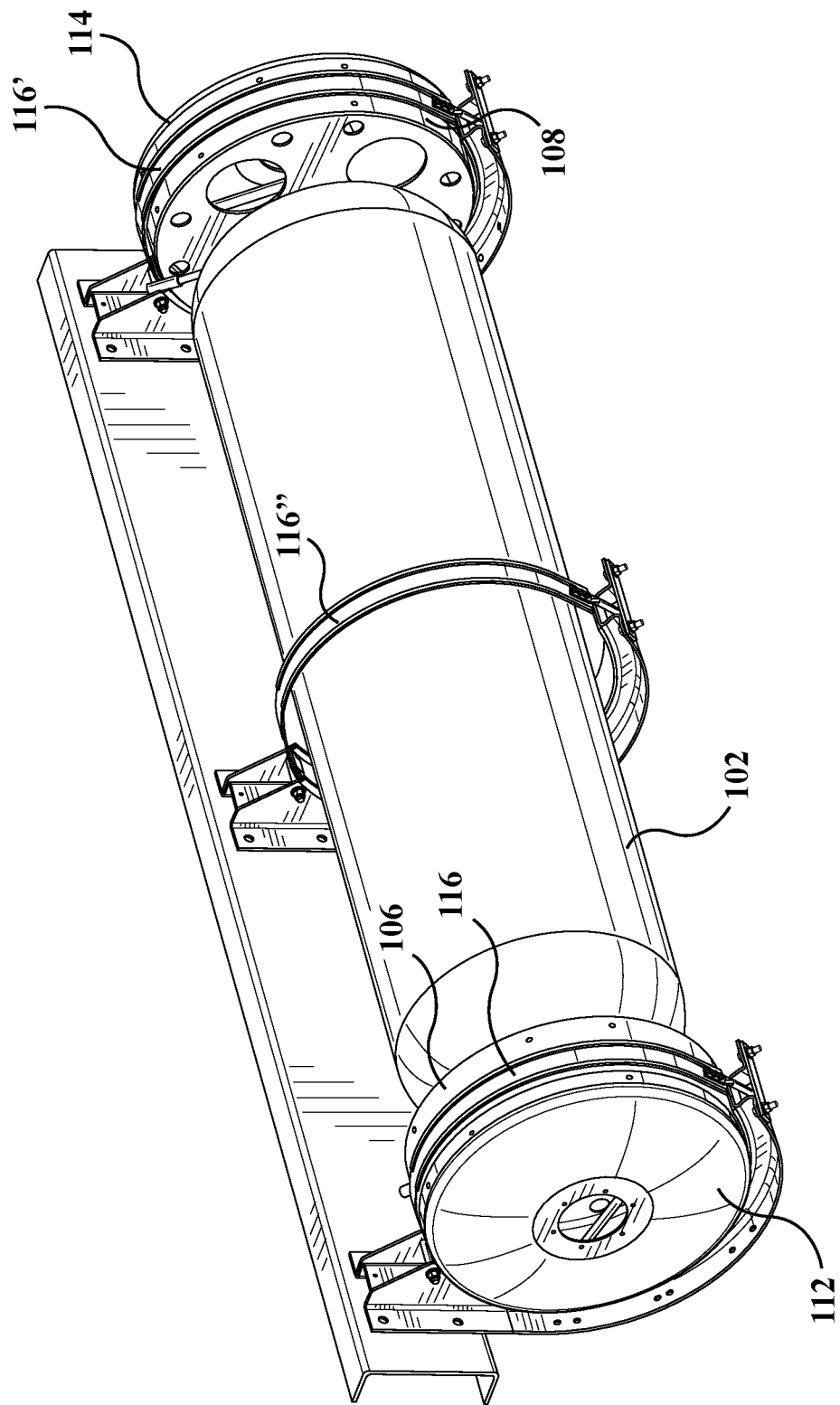
FIG. 2 is an illustration of a support system with the housing removed.
Figure 3:
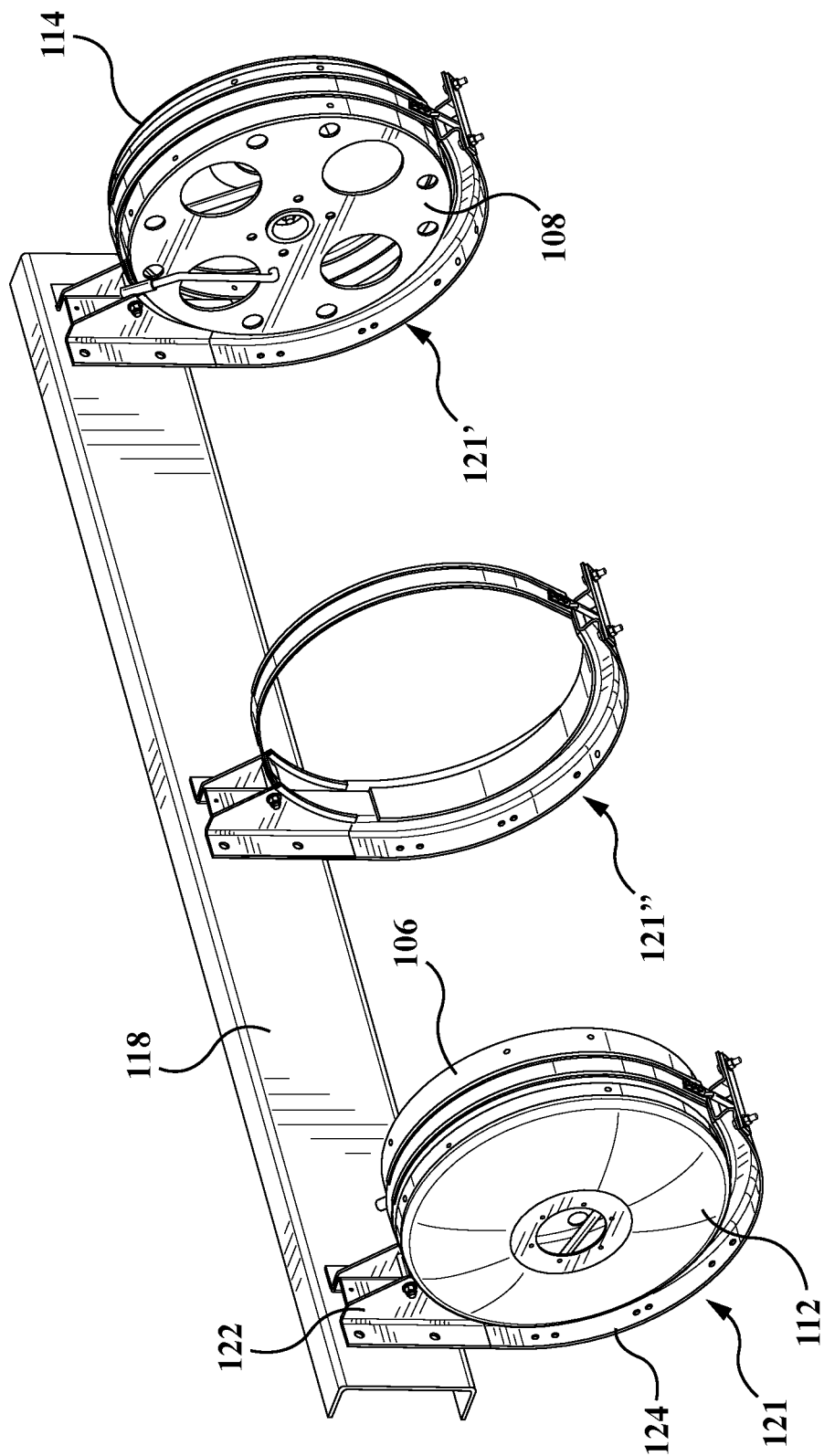
FIG. 3 is an illustration of a support system without a housing or a container.
Figure 4:
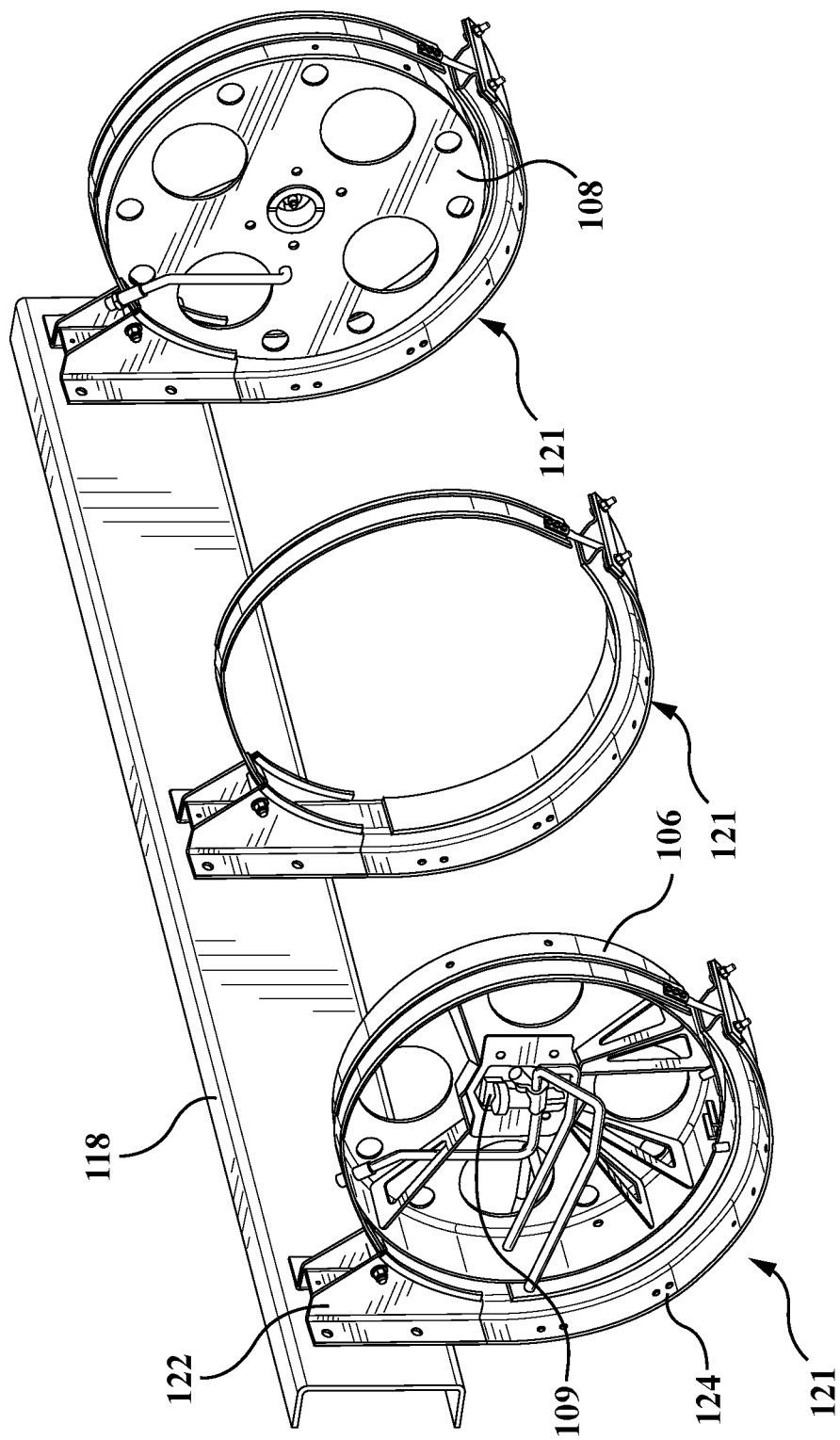
FIG. 4 is an illustration of one or more elements a support system.

FIGS. 1-4 illustrate a support system 100 or portions thereof for a container 102 that houses a material. FIG. 1 illustrates the support system 100 that is configured to affix to a portion of a vehicle. FIG. 2 illustrates the support system 100 without the housing 104 illustrated but with the container 102. FIG. 3 illustrates the support system 100 without the housing 104 and without the container 102. FIG. 4 illustrates the support system 100 without the housing, without the container 102, without the first shield plate 112 and without the second shield plate 114.

The support system 100 can support, brace, secure, and/or hold one or more containers within the housing, wherein the support system 100 includes elements for support and protection of the container 102. In particular, the support system 100 includes a housing 104 that encases the container 102 (collectively referred to as a storage system). By way of example and not limitation, the housing 104 can be a shape which matches or is similar to a shape of the container 102. In a particular embodiment, the container 102 can be a cylindrical shape and the protective member 104 can be a cylindrical shape having a size that is capable of enclosing the container 102 within the housing 104.

Figure 37:
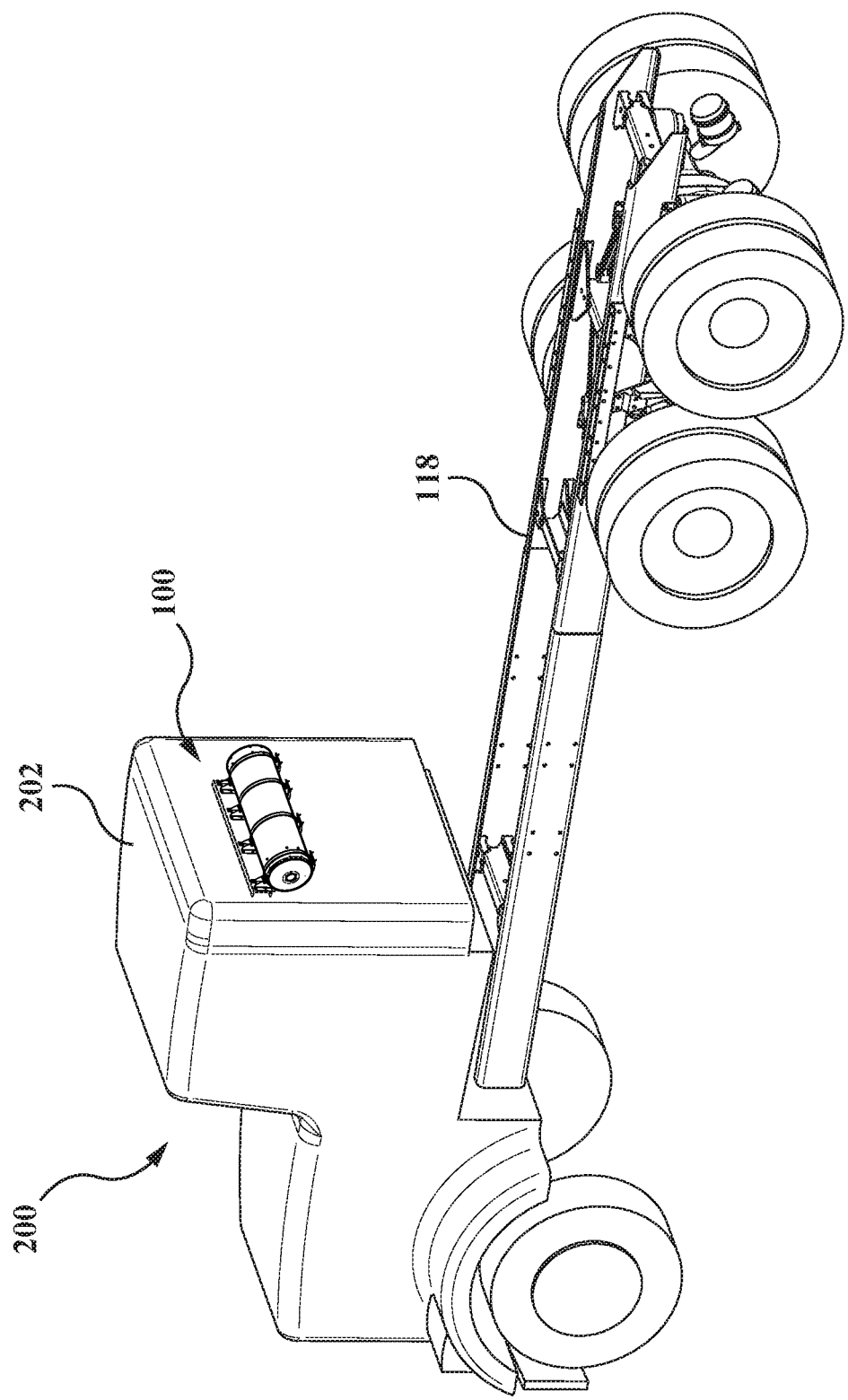
FIG. 37 is an illustration of a support system coupled to a cabin of a vehicle.
Figure 38:
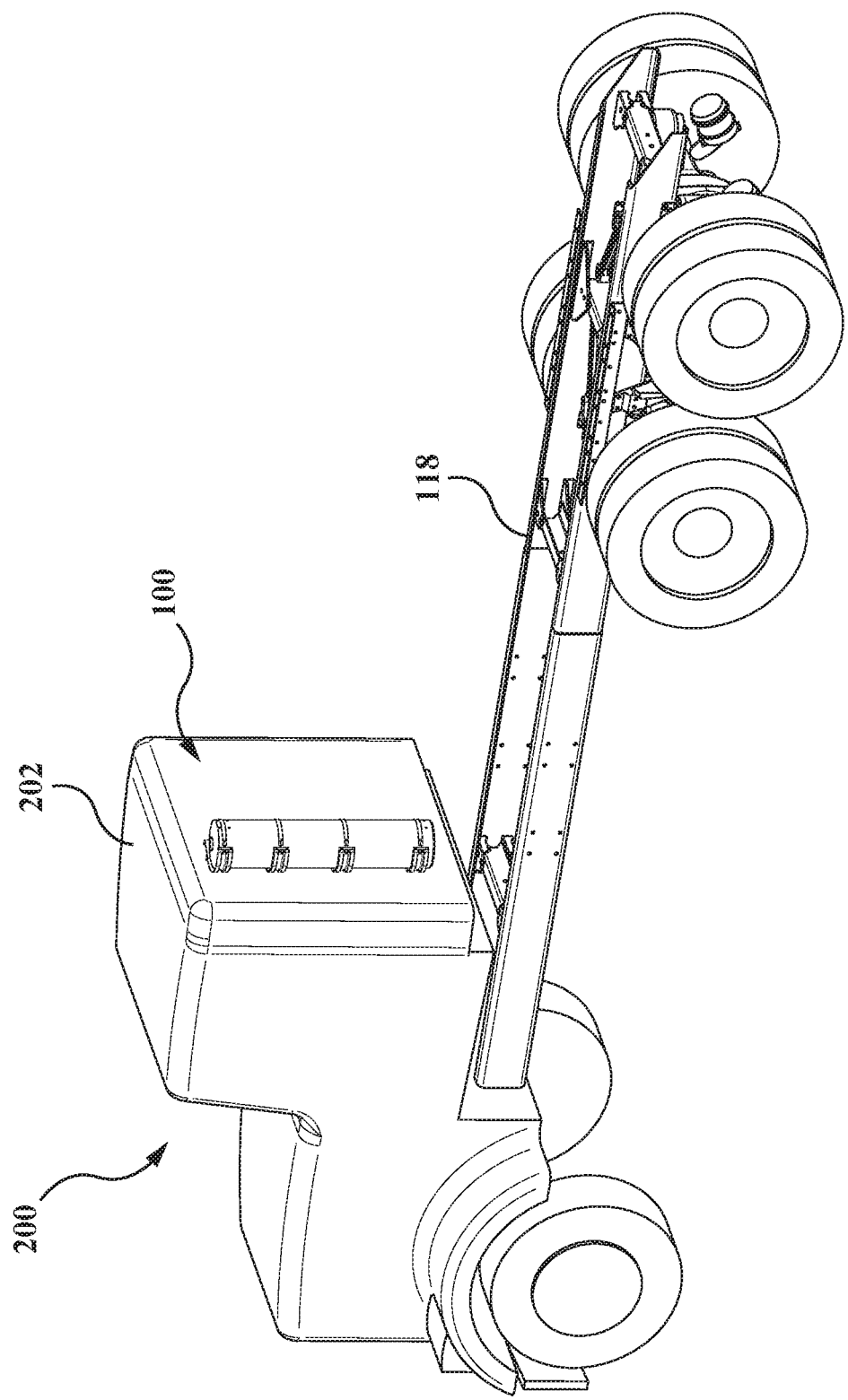
FIG. 38 is an illustration of a support system coupled to a cabin of a vehicle.
Figure 39:
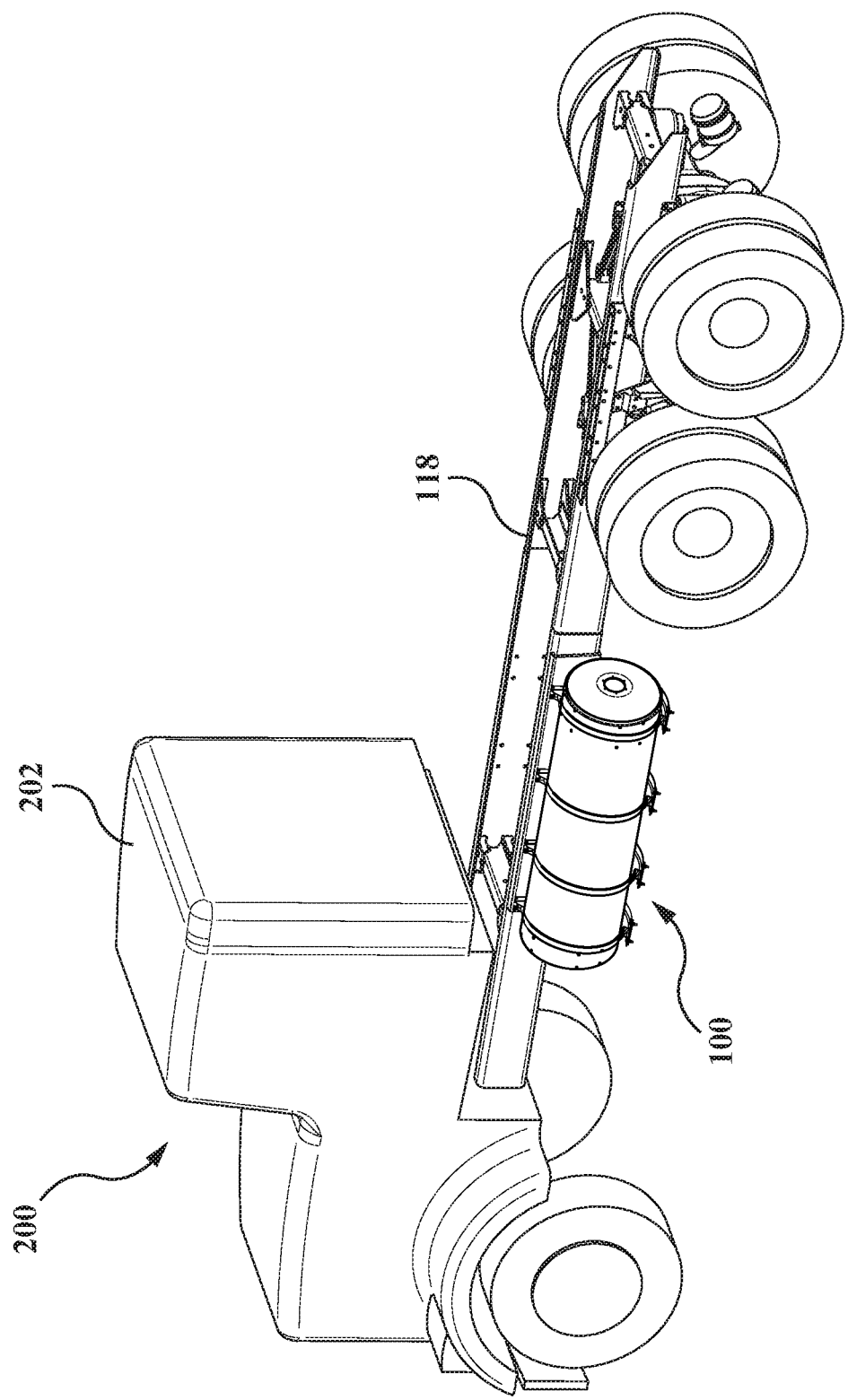
FIG. 39 is an illustration of a support system coupled to a chassis or frame of a vehicle.

The support system 100 can be coupled to at least one of a frame of a vehicle, a chassis of a vehicle, a structure of a vehicle, among others. Moreover, the support system 100 can be coupled or affixed at a location that is below a cabin of the vehicle, wherein the cabin is a location in which a passenger or driver are seated. By way of example and not limitation, the vehicle can incorporate one or more support systems 100 such that a first support system is positioned on a driver side and a second support system is positioned on a passenger side. In another embodiment, the vehicle can have one or more support systems coupled at locations such as, but not limited to, above a frame or chassis of the vehicle, behind a cabin of a vehicle and above a fame, below a frame or chassis of the vehicle and below a cabin of a vehicle, among others. It is to be appreciated that if more than one support system is utilized on a vehicle, the location for each support system can be symmetrical in position, or not symmetrical. For instance, a vehicle can utilize a first support system in a vertical position behind the cab and above the chassis and a second support system in a horizontal position below the cab and level with or below the chassis. Various configurations of the support system 100 attached to a vehicle 200 or a cabin 202 are illustrated in FIGS. 37-39.

For a support system 100 that includes a container that is oriented horizontal compared to the ground level, the container can be underneath a portion of a cabin of the vehicle on a side (e.g., passenger side, driver side, or a position in between the passenger side and driver side) of the vehicle and mounted to a frame of the vehicle, a chassis of the vehicle, a structure affixed to a vehicle, or a structure affixed to a chassis or frame of the vehicle. In another embodiment, the support system 100 can include a container that is oriented horizontal compared to the ground level and parallel compared to an axle of the vehicle (e.g., a position that has the container first end on the driver side and the second side on the passenger side), wherein the support system 100 is coupled to a back of a cab.

For a support system that includes a container that is oriented vertical compared to the ground level, the container can be positioned behind a cabin of the vehicle and mounted to a frame of the vehicle, a chassis of the vehicle, a structure affixed to the vehicle, a portion of a cabin of the vehicle, or a structure affixed to a chassis or frame of the vehicle.

The one or more containers can reside in a plane that is in a linear orientation and located in a substantially similar plane as at least one of an axle of the vehicle, a chassis of the vehicle, a driveshaft of the vehicle, or the frame of the vehicle. Further, the one or more containers may be parallel to a ground to which the vehicle travels. In an embodiment, the support system 100 can be adapted to be used with a vehicle that is powered by a combustible fuel engine, an alternative fuel, a battery, or a combination thereof. The subject innovation describes a support system 100 that can be attached to at least one of a portion of a vehicle underneath a portion of a cabin, a portion of a structure of the vehicle, along a side of the vehicle, or a portion of a cabin or frame at a position behind a cabin of the vehicle, among others.

In an embodiment, the support system 100 can be affixed to a cab of a vehicle in which one or more containers are oriented in a vertical position or substantially vertical in comparison to the ground level (e.g., a length of the container being perpendicular or substantially perpendicular to a chassis or frame of the vehicle).

The support system 100 can be positioned on a vehicle on a location that is where a diesel fuel tank would exist such as a saddlebag configuration. The system 100 can be positioned between the steer axle and the drive axle of a vehicle and at a location below or at the chassis 118 of the vehicle. For instance, the system 100 can be used to exchange or replace a diesel fuel tank with the system 100. The replacement or exchange can allow removal of the diesel tank(s) and attaching the bracket assemblies and other elements.

The container 102 can be cylindrical in shape but it is to be appreciated that the container 102 can be a shape that holds a volume of a material and such shape can be selected with sound engineering judgment without departing from the scope of the subject innovation. The container 102 is described in more detail in FIG. 6 and below.

The support system 100 can include a bracket assembly 121 that is coupled to at least one of a chassis 118 of a vehicle, a frame of a vehicle, or a structure on a vehicle. It is to be appreciated that the support system 100 can include one or more bracket assemblies 121 and a number of bracket assemblies 121 can be selected with sound engineering judgment without departing from the scope of the subject innovation. In a particular embodiment, a vehicle can include a first support system 100 that can include three (3) bracket assemblies 121 located on a driver side and a second support system 100 that can include three (3) bracket assemblies 121. In another embodiment, the vehicle can include one or more support systems 100, wherein the support system 100 can include two (2) bracket assemblies.

The housing 104 is an exterior barrier that the container 102 is placed within to provide protection. The housing 104 can be a shape and size that is configured to enclose the container 102. In an embodiment, the housing 104 can be a first shape defining a first volume and the container 102 can be a second shape defining a second volume, wherein the first shape is similar to the second shape and the first volume is greater than the second volume to allow the container 102 to fit inside the housing 104. The housing 104 can include a first end 101 and a second end 103 opposite the first end 101 and a length between the first end 101 and the second end 103. The housing 104 can further include a thickness. A first plate shield 112 can be coupled to the first end 101 to enclose the first end 101 and a second plate shield 114 can be coupled to the second end 103 to enclose the second end 103. It is to be appreciated that the first plate shield 112 or the second plate shield 114 can be releaseably coupled or permanently coupled to the first end 101 or the second end 103 respectively. It is to be appreciated that the container 102 can be oriented in various manners such as the first end 101 of the container 102 can be situated toward an engine of the vehicle and the second end 103 can be situated toward a rear of the cabin or the first end of the container 102 can be situated toward rear of the cabin and the second end 103 can be situated toward an engine of the vehicle.

The bracket assembly 121 can couple to a structure on a vehicle or a portion of the vehicle as well as provide support to the housing 104 and the container 102 positioned within. In particular, the bracket assembly 121 can support or couple to an exterior of the housing 104. The bracket assembly 121 can include a coupling member 122 and a curved member 124 in which the coupling member 122 is affixed to a portion of the chassis 118 and the curved member 124 can be used to support or hold the housing 104 that protects and encases the container 102. As previously discussed, it is to be appreciated that the support system 100 can include one or more bracket assemblies 121 and each bracket assembly 121 can include at least one of the coupling member 122, the curved member 124, or a strap 116. Various configurations of the bracket assembly 121 can be selected with sound engineering judgment and such configurations are within the scope of this subject innovation. Configurations of the bracket assembly 121 are illustrated in FIGS. 32-36 (discussed in more detail below). It is to be appreciated that the system 100 can use straps 116 or be strapless. Additionally, the bracket assembly 121 is illustrated in FIGS. 25-29.

In an embodiment, the support system 100 can include two or more bracket assemblies 121 to couple to or support the housing 104. In an embodiment, the bracket assembly 121 can be in a "J" shape in which the curved member 124 supports the housing 104. In another embodiment, the bracket assembly can be in an upside-down "J" shape in which the curved member 124 is affixed or coupled to the housing 104. The upside down "J" configuration can provide more ground clearance. A strap 116 can be used for each bracket assembly 121 in which the strap 116 provides support to secure the housing 104. For example, the strap 116 can include a first end and a second end, wherein the first end couples to the coupling member 122 and the second end couples to at least one of the coupling member 122 or the curved member 124. In an embodiment, a first strap 116 can be positioned on an exterior of the housing 104 at a position that is in between the first inner plate 106 and the first shield plate 112. In the embodiment, a second strap 116' can be positioned on an exterior of the housing 104 at a position that is in between the second inner plate 108 and the second shield plate 114.

In an embodiment, a first bracket assembly 121, a second bracket assembly 121", and a third bracket assembly 121' can be utilized in which the first bracket assembly 121 is on the first end 101 and the third bracket assembly 121' is on the second end 103, and the second bracket assembly 121" is in between the first bracket assembly 121 and the third bracket assembly 121'. Moreover, each bracket assembly can include a strap 116. In particular, a strap 116 on the first bracket assembly can be positioned in between a first inner plate 106 and the first shield plate 112. Moreover, a strap 116' on the third bracket assembly 121' can be positioned in between a second inner plate 108 and the second shield plate 114. The strap 116" can be positioned around a circumference of the housing 104.

Figure 6:
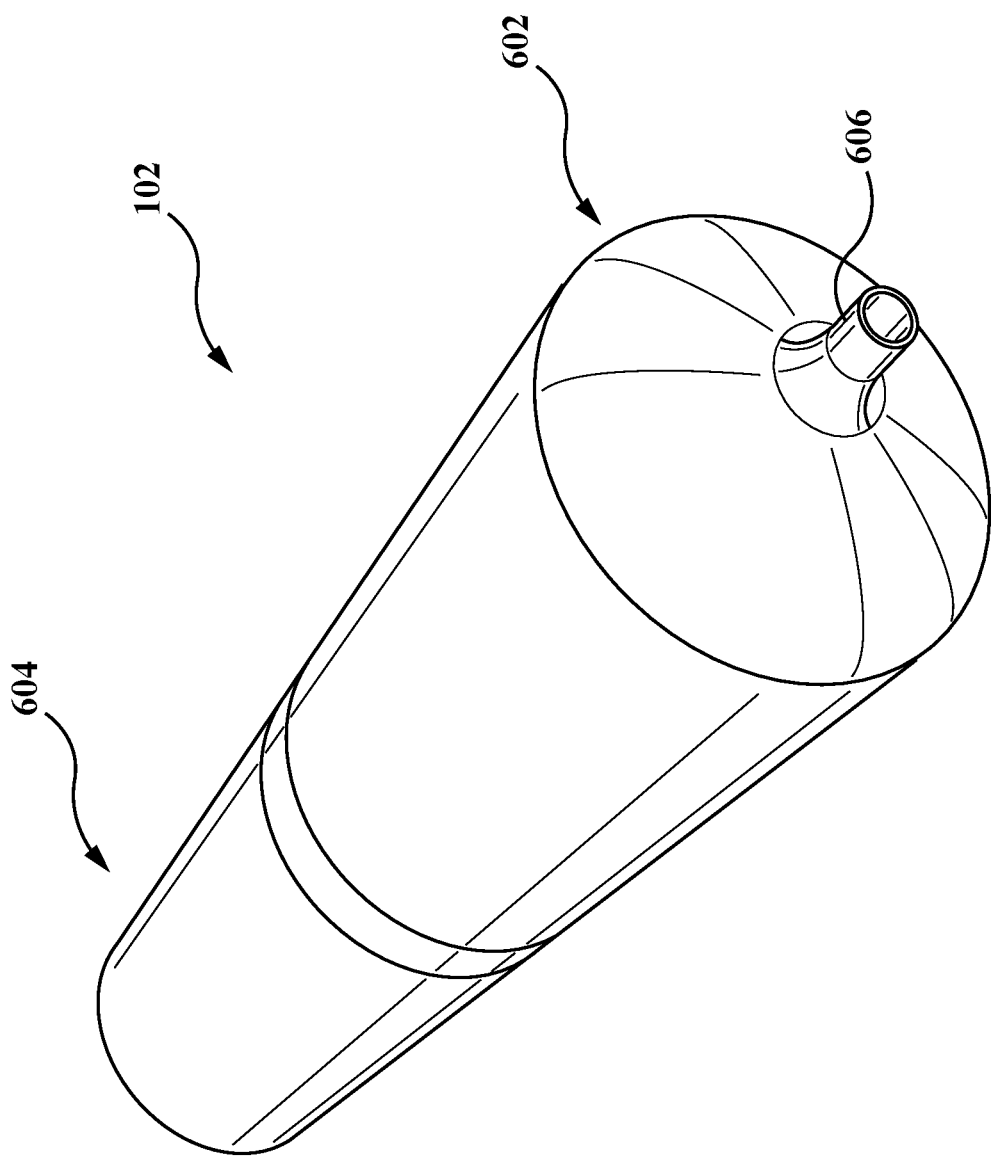
FIG. 6 is a view of a container.

Turning to FIG. 6, the container 102 is illustrated. The container 102 can include a first end 602, a second end opposite thereto 604, a neck 606 located on the first end 602 and a pressure release device (PRD) on the second end 604. The neck 606 can be configured to receive a valve 109 (See FIG. 4) or fitting that enables filling or dispensing of a portion of material. For instance, the valve can be a two-way valve that allows material to enter the container 102 and also allow the material to exit the container 102. The container 102 can be cylindrical in shape with a length, a diameter, and a thickness. Yet, it is to be appreciated that the container 102 shape, materials, composition, or size can be chosen with sound engineering judgment without departing from the intended scope of coverage of the embodiments of the subject invention. The container 102 can include one or more liners of a material. For instance, the container 102 can include a liner made of a first material. In certain embodiments, the first material is at least one of a plastic, a metal, a steel, a thermoplastic, among others. In certain embodiments, the container 102 can include a wrapping of a second material. In certain embodiments, the second material is at least one of a carbon fiber, a composite material, a Teflon, or a disparate material from the first material. In certain embodiments, the container 102 is made of at least one of a metal, a plastic, a polymer, or a composite material.

In an embodiment, the container 102 can include a closed end on the second end 604 and an open end opposite thereto (e.g., on the first end 602), wherein the open end is integrated with at least one of a boss, a neck, a valve, an opening configured to couple to a valve, among others. It is to be appreciated that the open end on the container 102 can be configured to receive material that is stored in the container 102 and/or configured to dispense material that is stored in the container 102, wherein the dispensing/receiving is with a component such as a valve, port, and the like. In an embodiment, the container 102 can include a valve on the first end 602 and a PRD on the second end 604, wherein the PRD can be configured to release pressure from the container 102 based on a parameter such as a pressure level, a safety event, a computer instruction to release the material in the container 102, among others.

It is to be appreciated that the container 102 can include one or more valves. For instance, the container 102 can include a first valve on the first end 602 and the PRD on the second end 604. In another instance, the container 102 can include a first valve on the first end 602 and an additional valve on the second end 604 opposite thereto. Moreover, it is to be appreciated that the container 102 can include one or more chambers within to house one or more materials. For example, a cylinder can be segmented to have a first chamber that houses a first material filled/dispensed with a first valve on the first end and a second chamber that houses a second material filled/dispensed with a second valve on a second end opposite to the first end.

It is to be appreciated that the container 102 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to an atmospheric pressure.

In still another example, one or more containers 102 can be used to store material for use with a fuel system for a vehicle. For example, in addition to compressed natural gas, the container 102 can be utilized with a fuel system that utilizes or consumes material such as renewable fuel sources, nonrenewable fuel sources, liquid fuel sources, or gas fuel sources for a vehicle, wherein the container 102 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, Ammonia, Formic acid, liquid Nitrogen, compressed air, or propane derived from renewable methods, among others. Nonrenewable fuel source can include gasoline, propane, or diesel, among others. Additional liquid or gas fuel sources can include any mixture or blend of energy sources, for example, E10, E15, E30, or E85 fuel, or HCNG (blend of compressed natural gas with Hydrogen). It is be appreciated that the container 102 can house a material chosen with sound engineering judgment without departing from the intended scope of coverage of the embodiments of the subject invention and such material can be used for a fuel system of a vehicle, a machine, a device, or any combination thereof.

Figure 5:
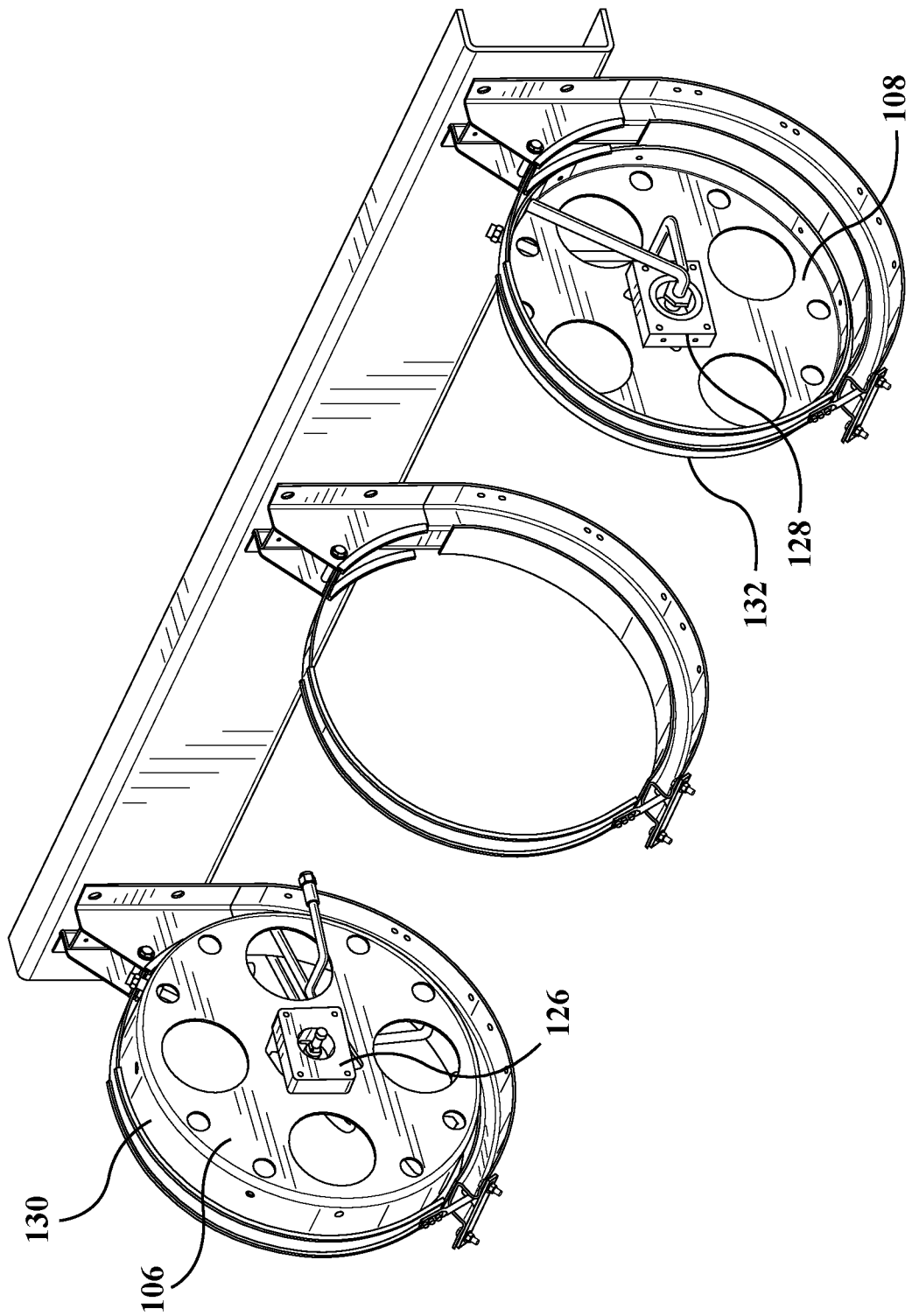
FIG. 5 is an illustration of one or more elements a support system.
Figure 17:
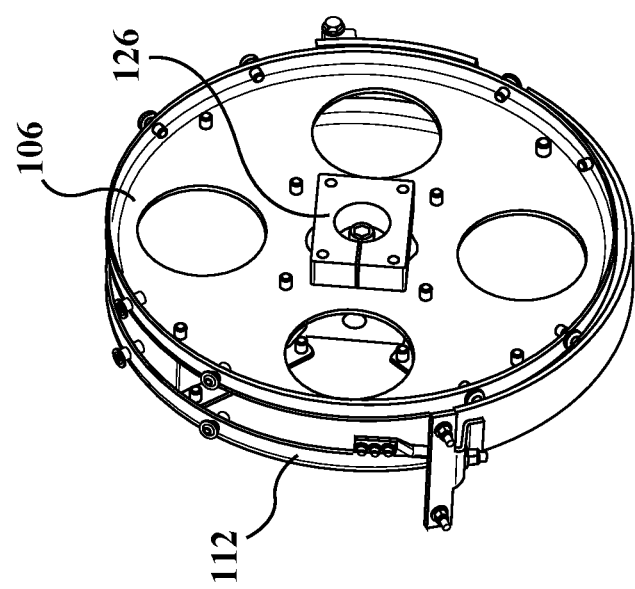
FIG. 17 is an illustration of a first inner plate, a neck mount, a truss assembly, and a first shield plate.
Figure 20:
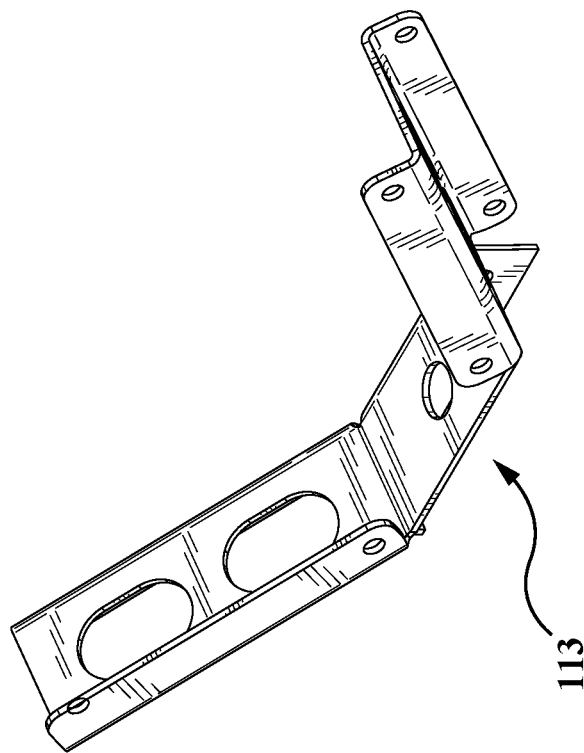
FIG. 20 is an illustration of a portion of the truss assembly.
Figure 19:
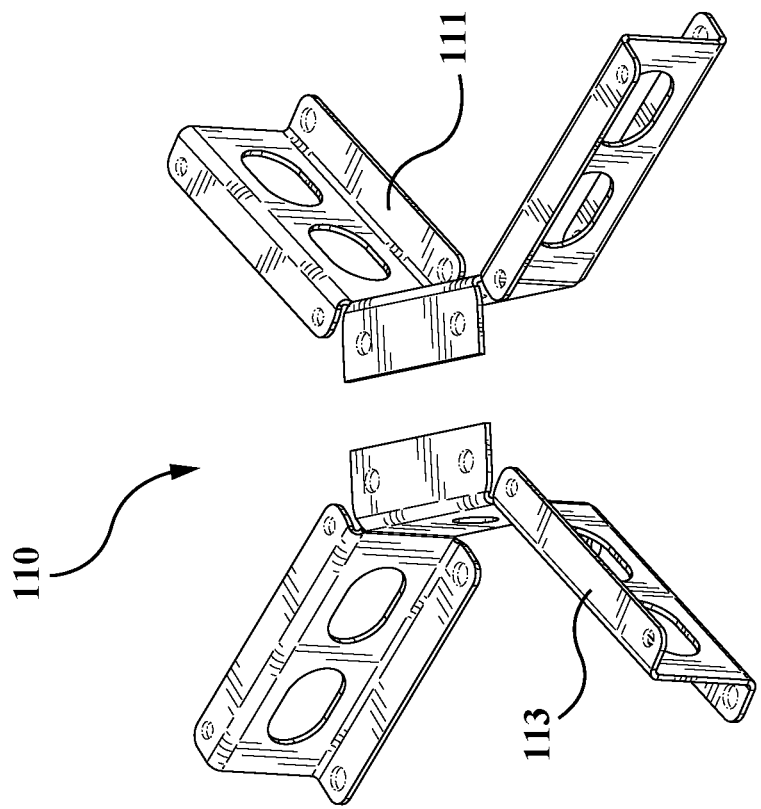
FIG. 19 is an illustration of a truss assembly.
Figure 21:
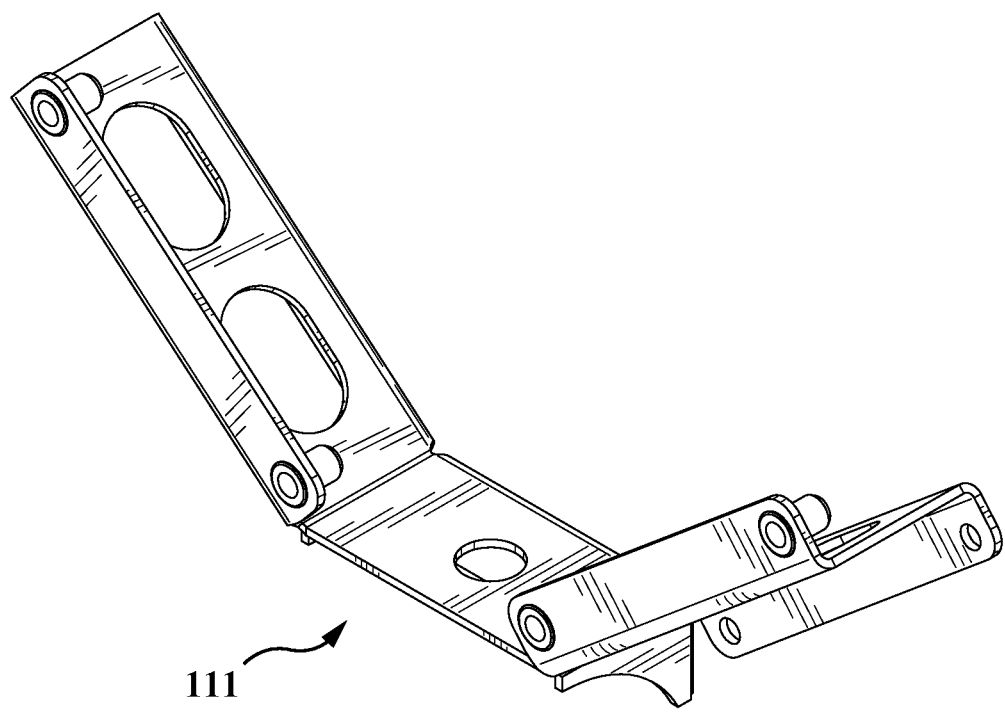
FIG. 21 is an illustration of a portion of the truss assembly.
Figure 22:
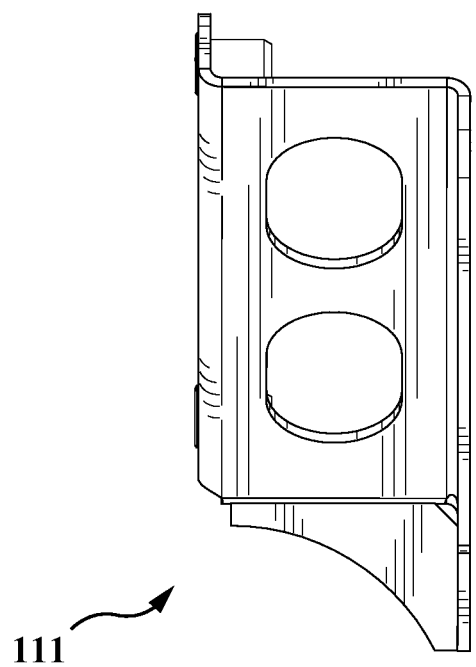
FIG. 22 is an illustration of a portion of the truss assembly.
Figure 23:
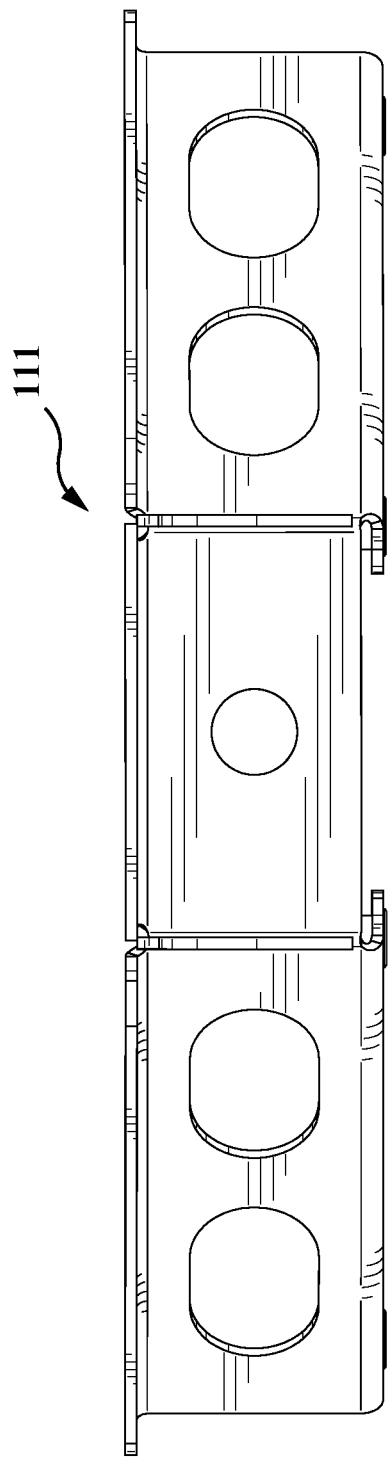
FIG. 23 is an illustration of a portion of the truss assembly.
Figure 24:
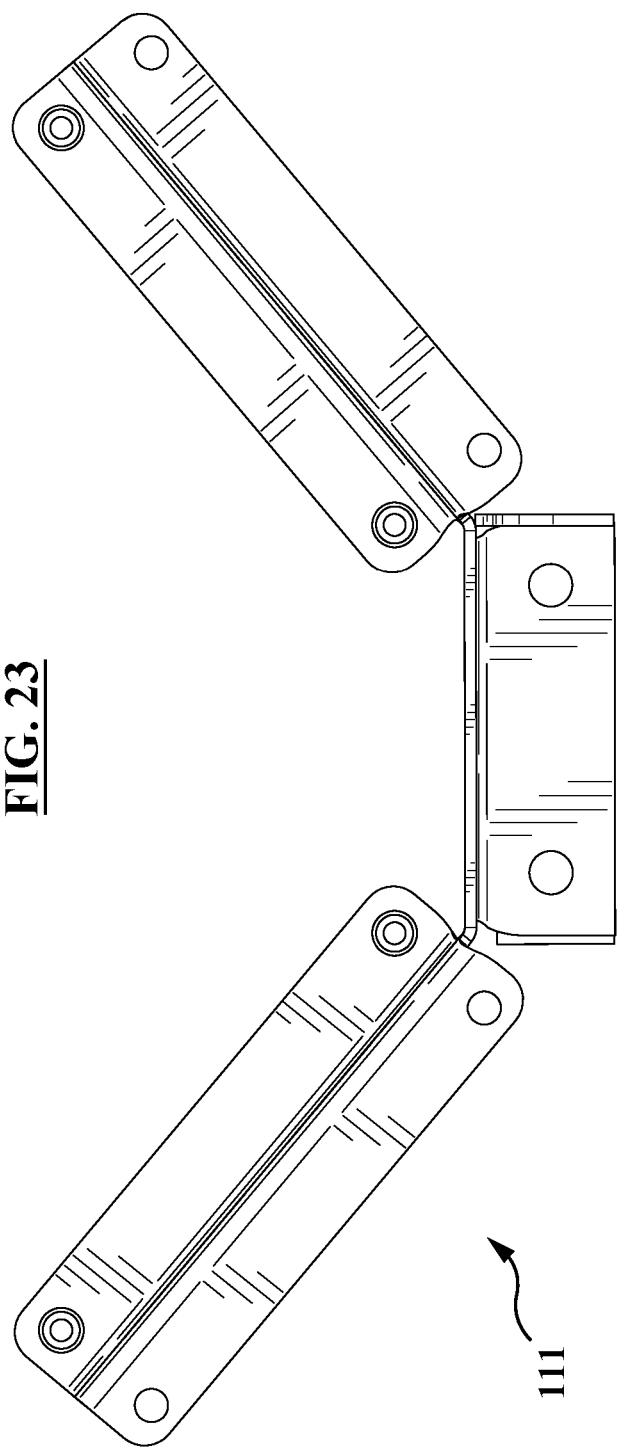
FIG. 24 is an illustration of a portion of the truss assembly.
Figure 25:
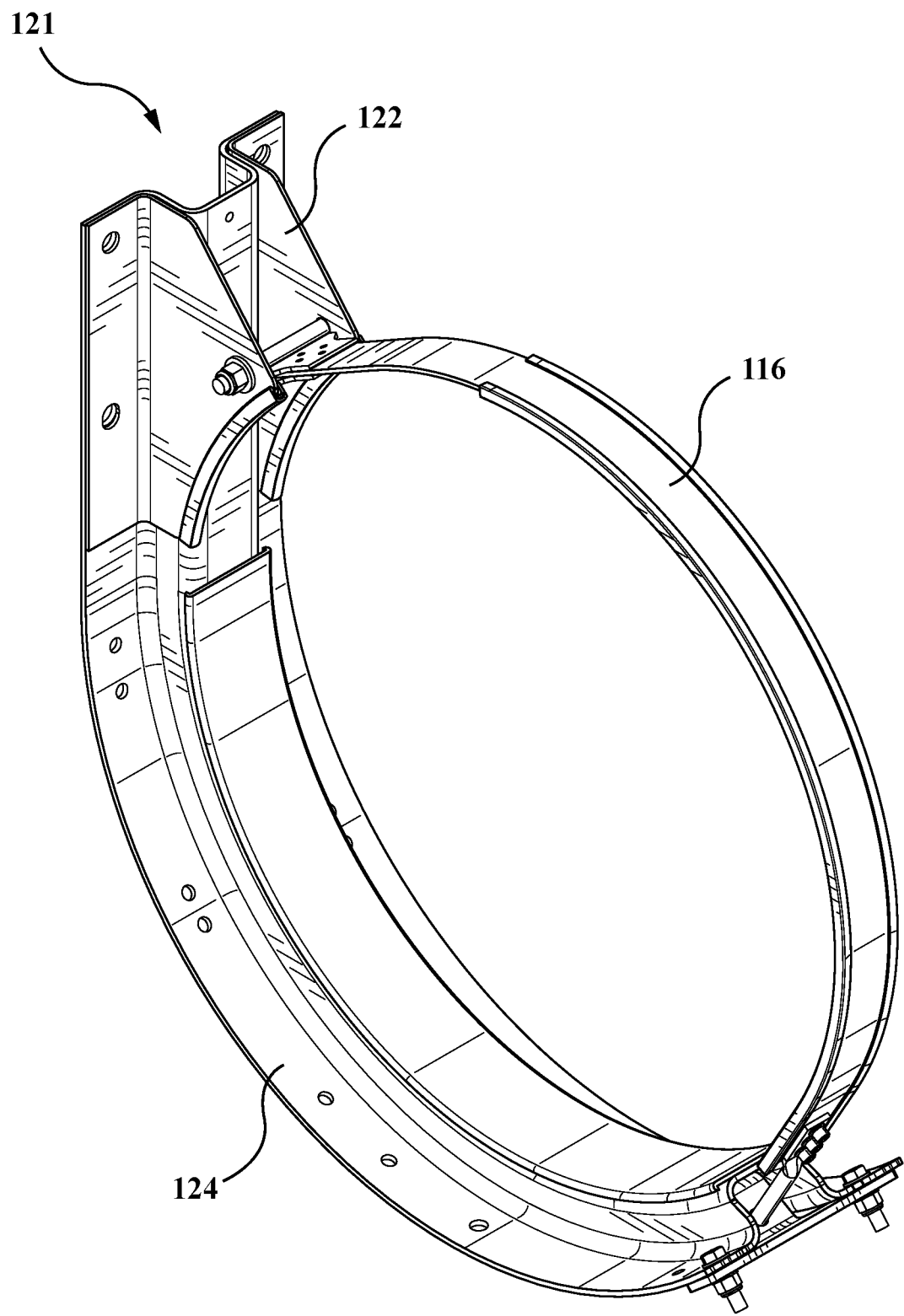
FIG. 25 is an illustration of perspective view of a bracket assembly and strap.
Figure 26:
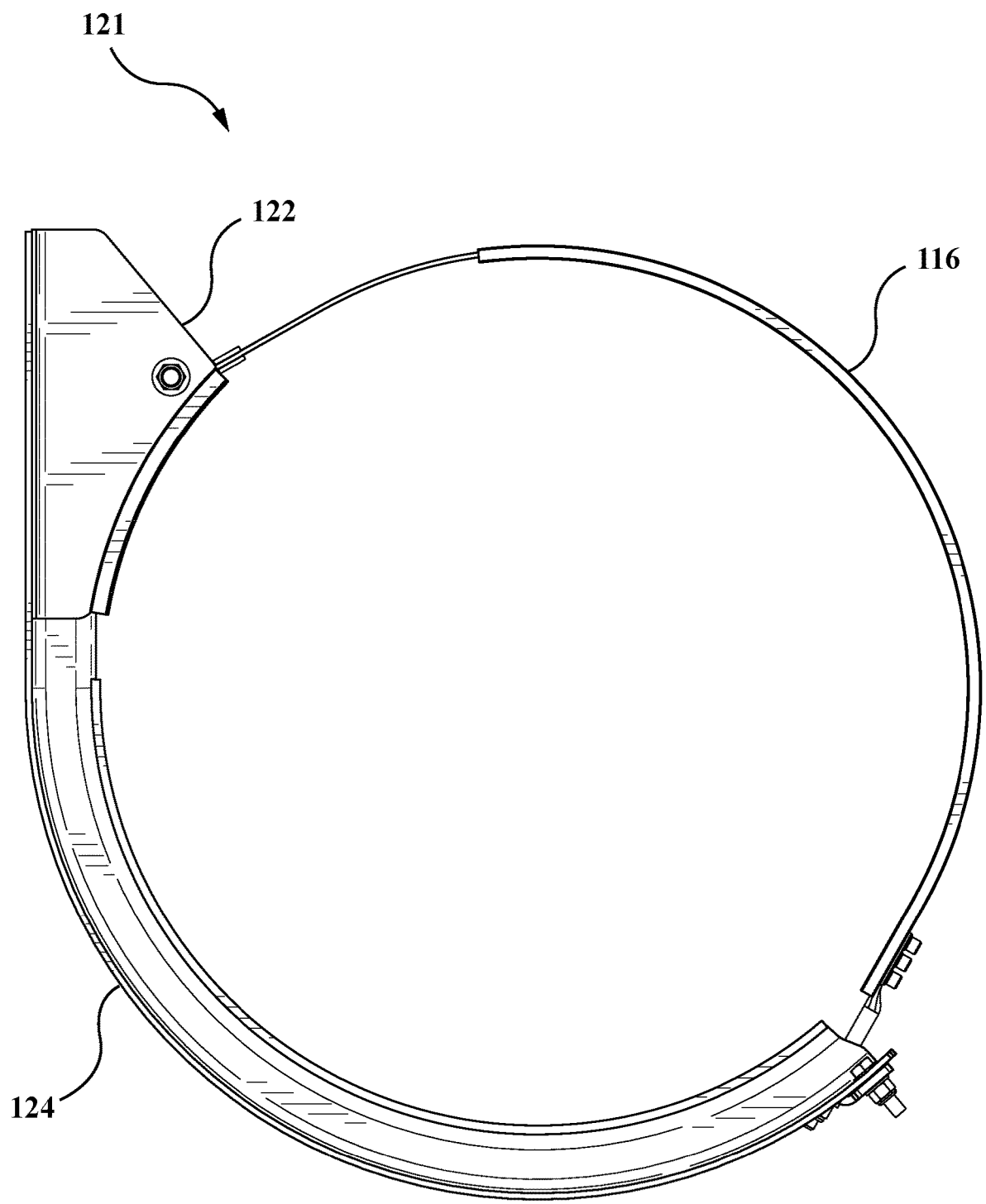
FIG. 26 is an illustration of side view of a bracket assembly and strap.
Figure 27:
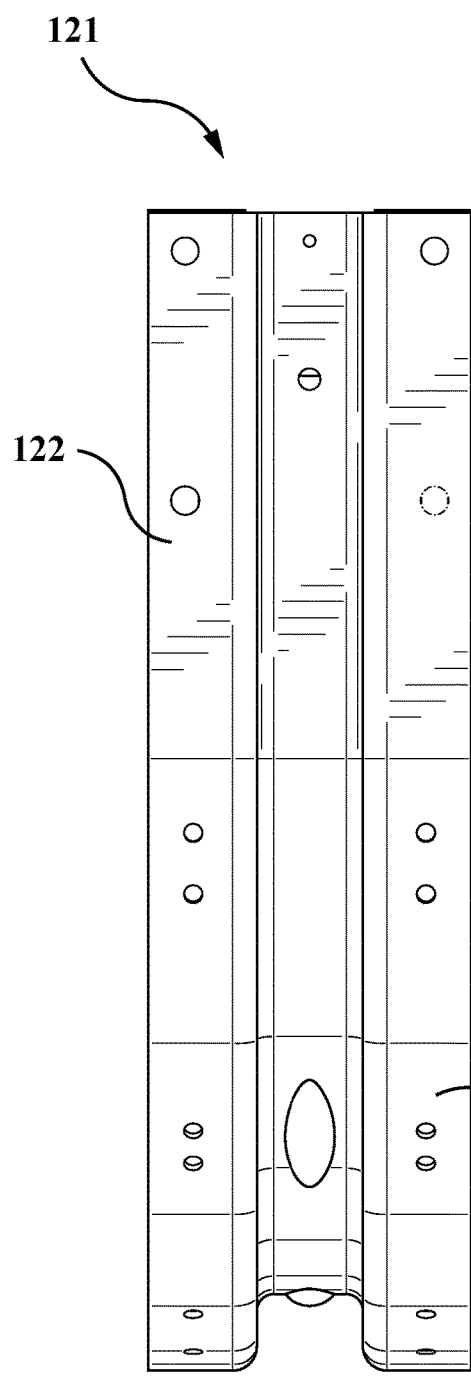
FIG. 27 is an illustration of rear view of a bracket assembly and strap.
Figure 28:
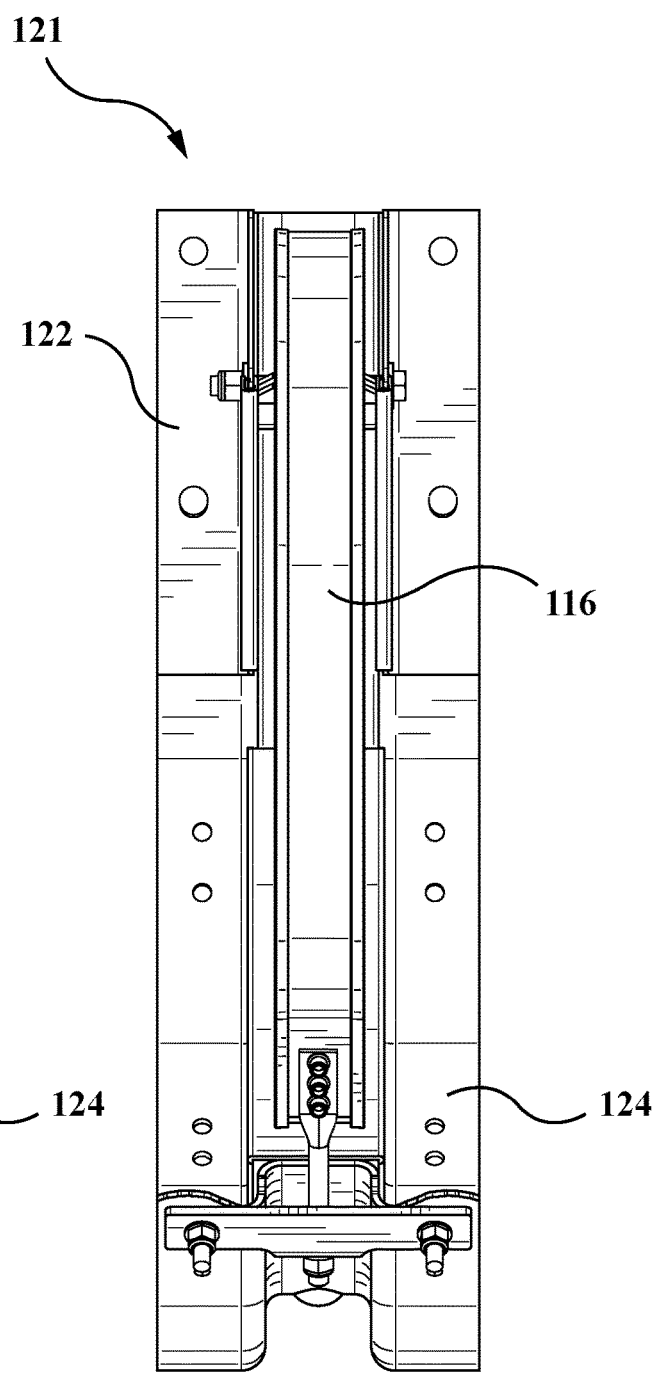
FIG. 28 is an illustration of front view of a bracket assembly and strap.
Figure 29:
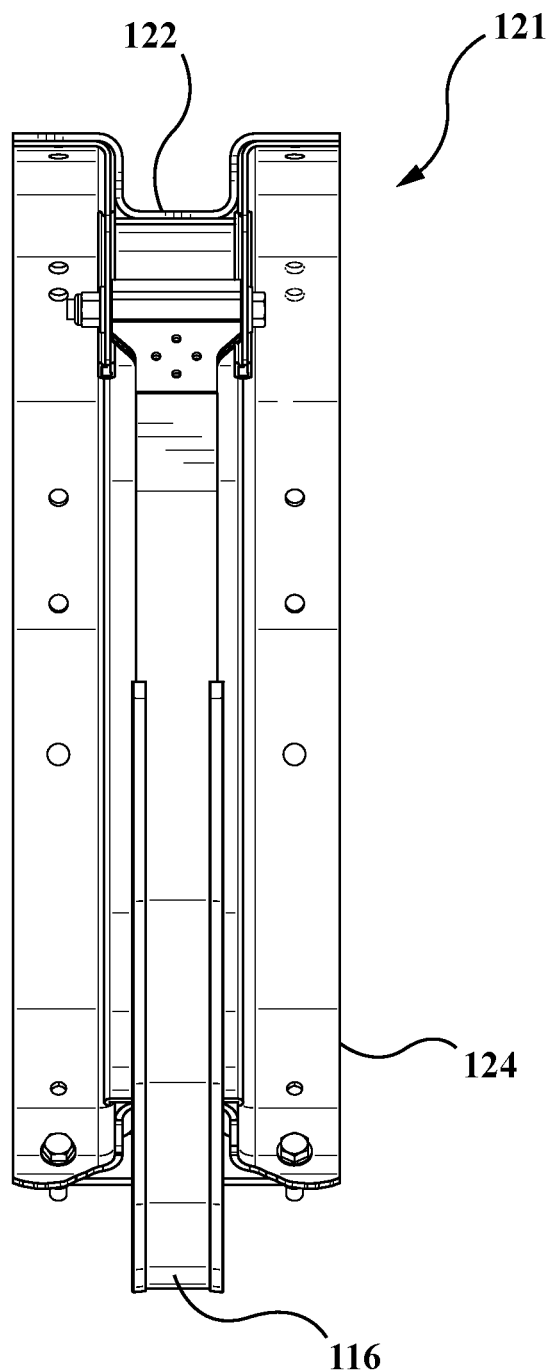
FIG. 29 is an illustration of top view of a bracket assembly and strap.
Figure 30:
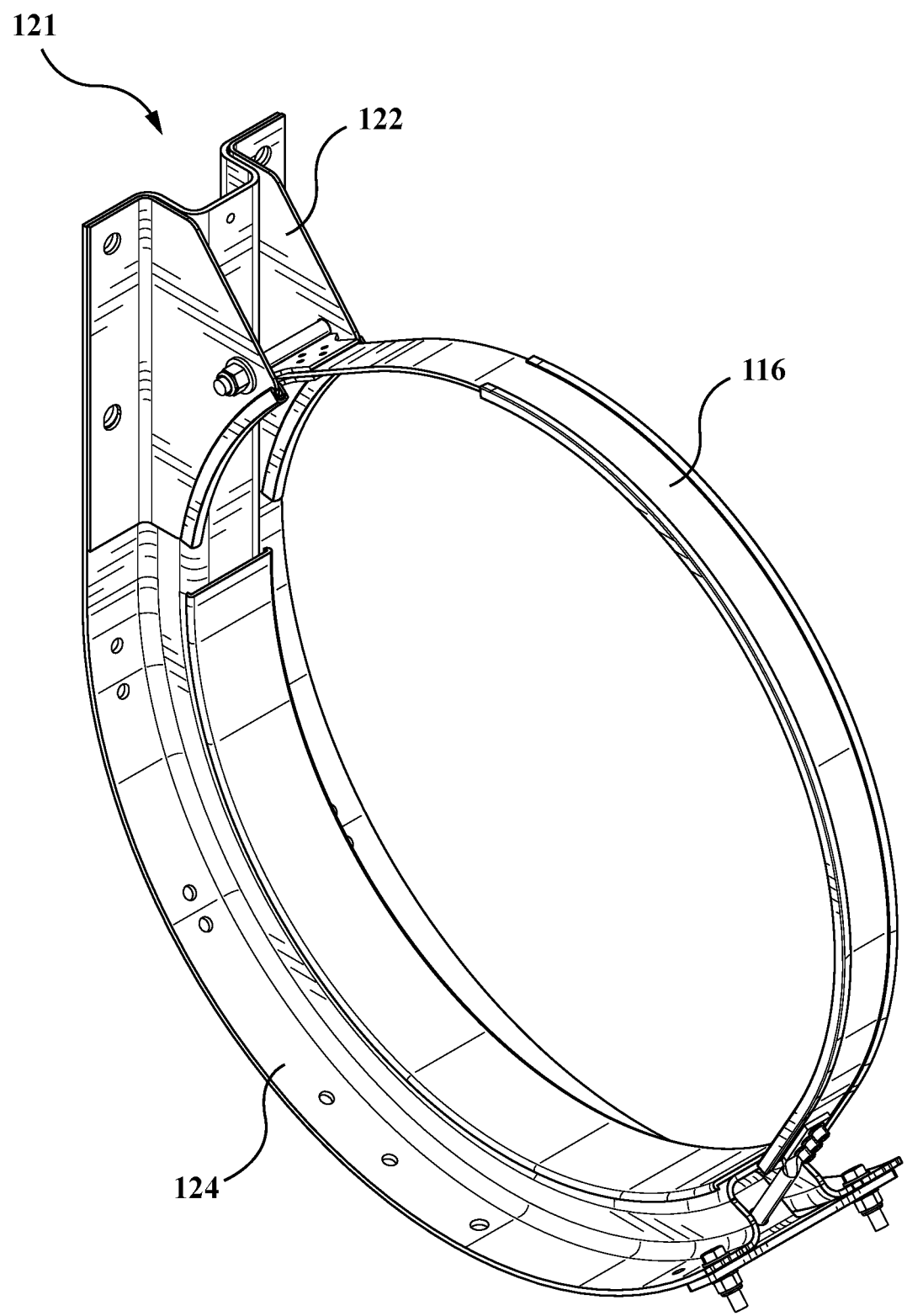
FIG. 30 is an illustration of a bracket assembly.
Figure 31:
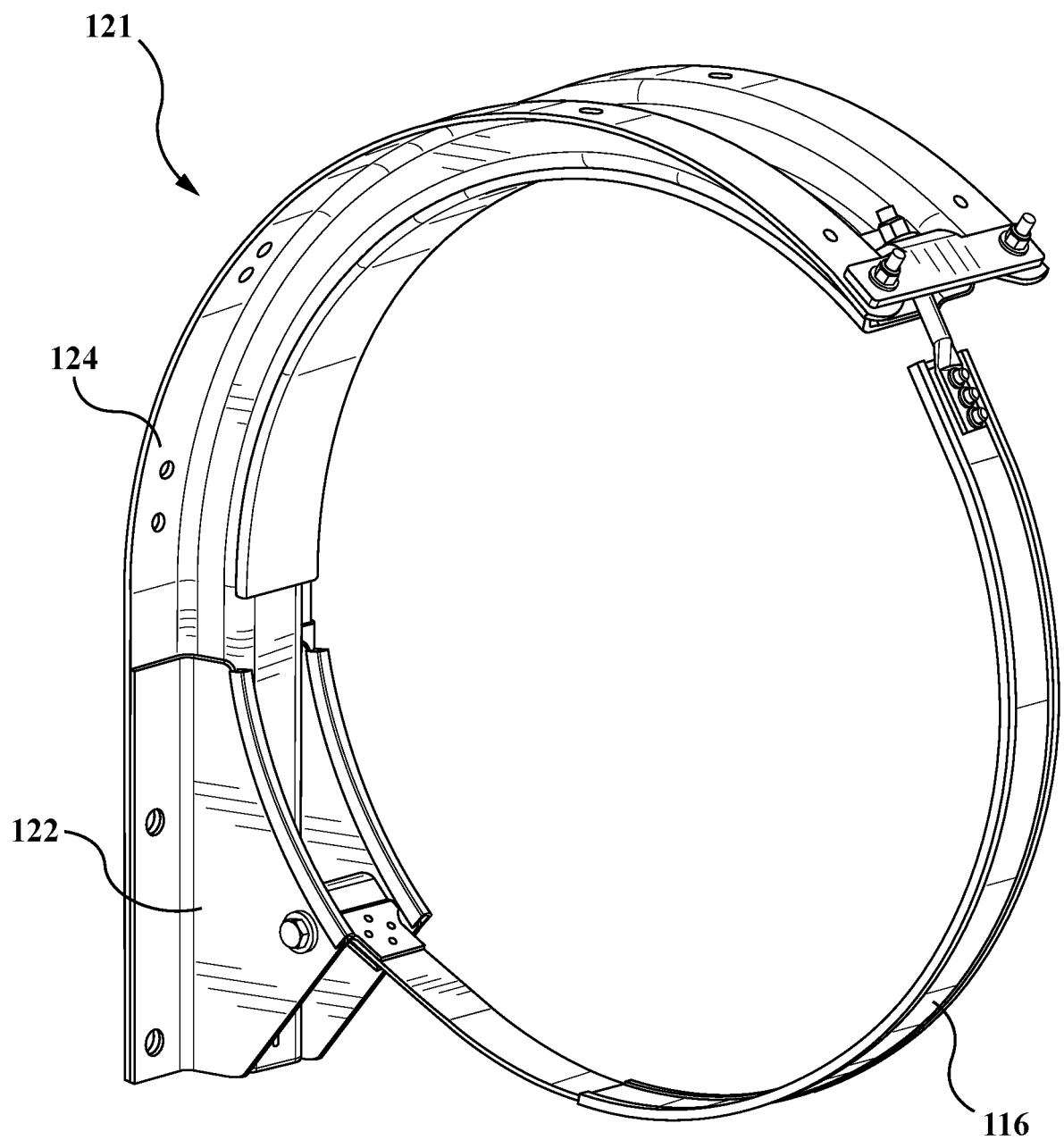
FIG. 31 is an illustration of a bracket assembly.
Figure 32:
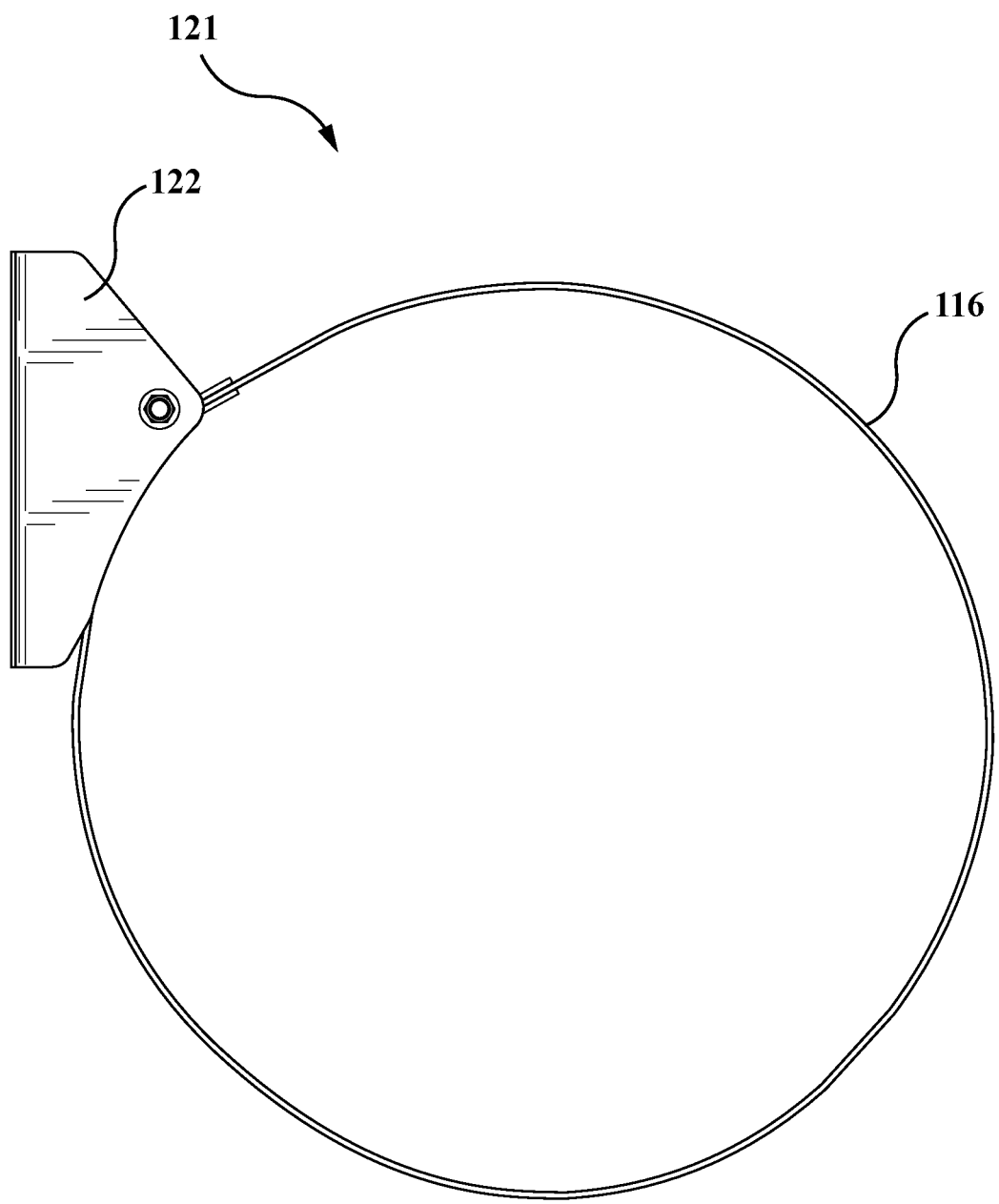
FIG. 32 is an illustration of a bracket assembly.

Referring to FIGS. 5 and 6, the container 102 can be secured within the housing 104 with a coupling of the ends of the container 102 to one or more mounting blocks. The container 102 can include a threaded male portion on the first end 602 of a neck 606 of the container 102 and the container 102 is coupled to a corresponding female portion on a first neck mount 126 (see also FIG. 17). The first neck mount 126 can include the female portion such as a collar that receives the neck 606 of the container 102. The second end 604 of the container 102 can be inserted into a second neck mount 128. In an embodiment, the coupling of the first end 602 of the container 102 to the first neck mount 126 can restrict movement whereas the second neck mount 128 can be configured to enable movement in a longitudinal direction from the first end 602 to the second end 604 based on a pressure change or a temperature change of the material in the container 102. In particular, the change in pressure or temperature of the material can result in an expansion or contraction of the container 102 and the support system 100 can accommodate such to prevent deterioration of the support system or components thereof.

The support system 100 allows a twisting motion of the container 102 from change in pressure or temperature or from motion/movement of the vehicle to which the bracket assemblies are attached. The support system 100 also provides protection in a roll situation for the vehicle in which the container 102 is bolted to a portion of the support system 100 with a bolting to the neck 606, one or more straps 116 (e.g., 6 inch straps), and/or a channel around a portion of the housing 104 for each straps with bolting accessible at the end of the straps. For instance, the bolting on the straps can be accessible on a bottom side of the vehicle when the support system 100 is oriented in a horizontal position (compared to ground).

Figure 9:
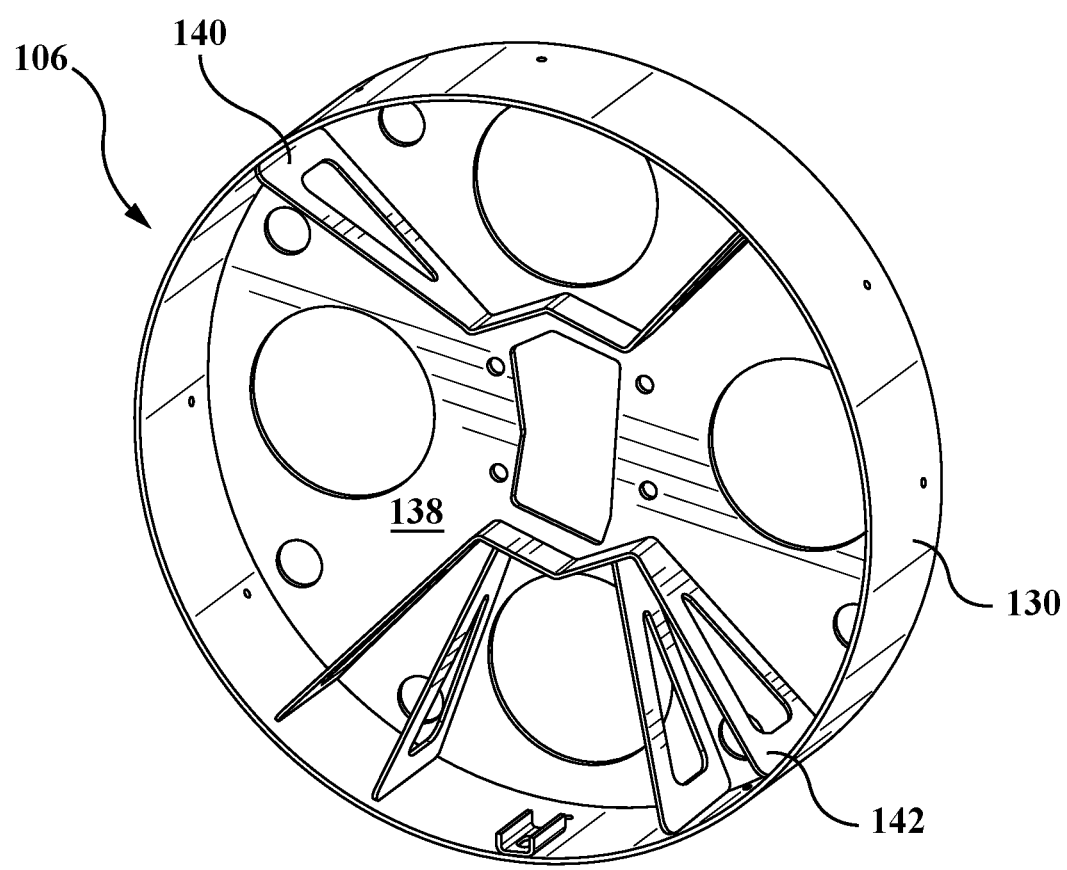
FIG. 9 is an illustration of a first inner plate.
Figure 10:
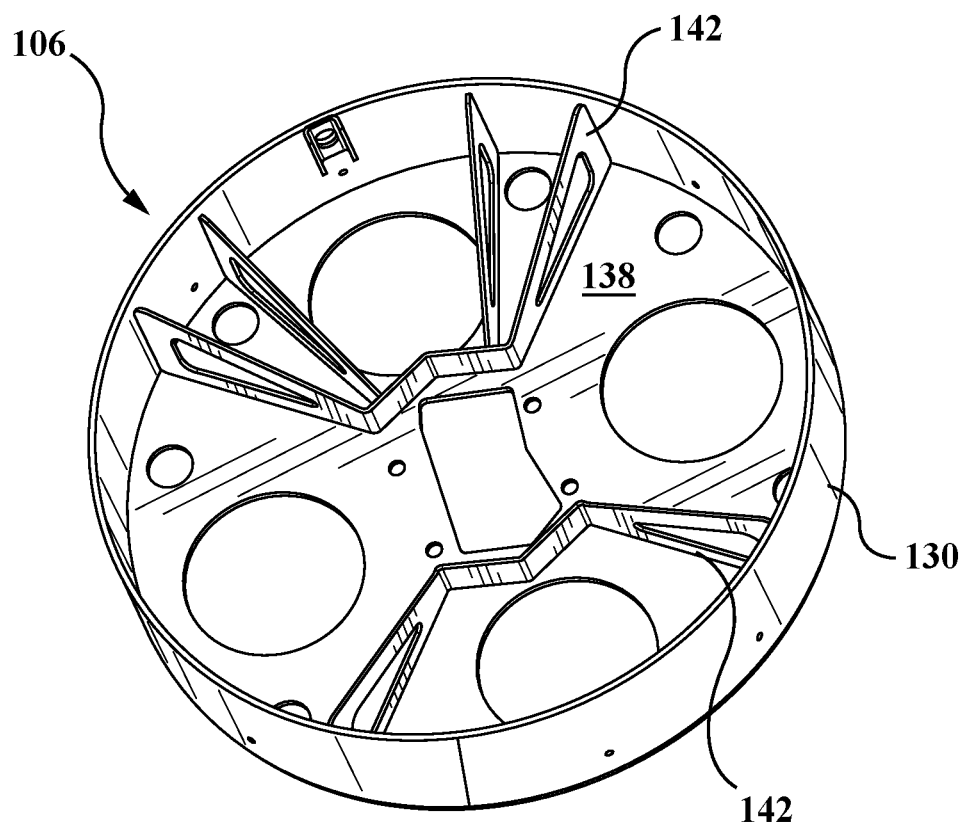
FIG. 10 is an illustration of a first inner plate.
Figure 16:
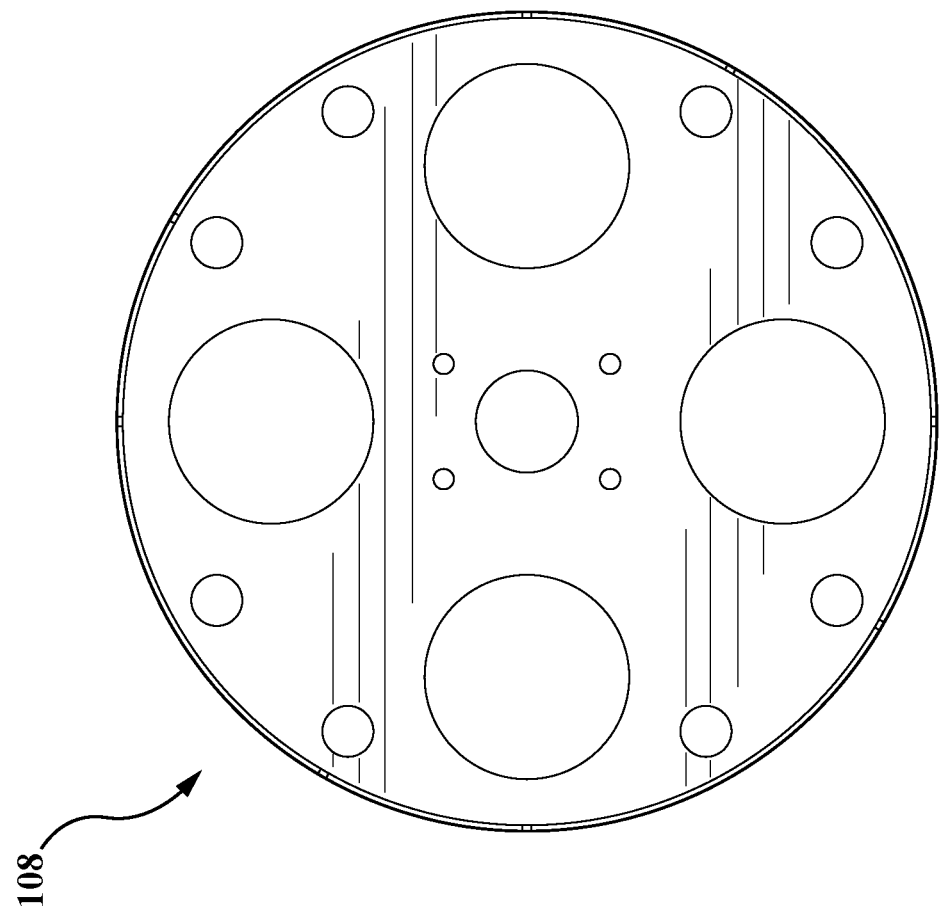
FIG. 16 is an illustration of a second inner plate.
Figure 15:
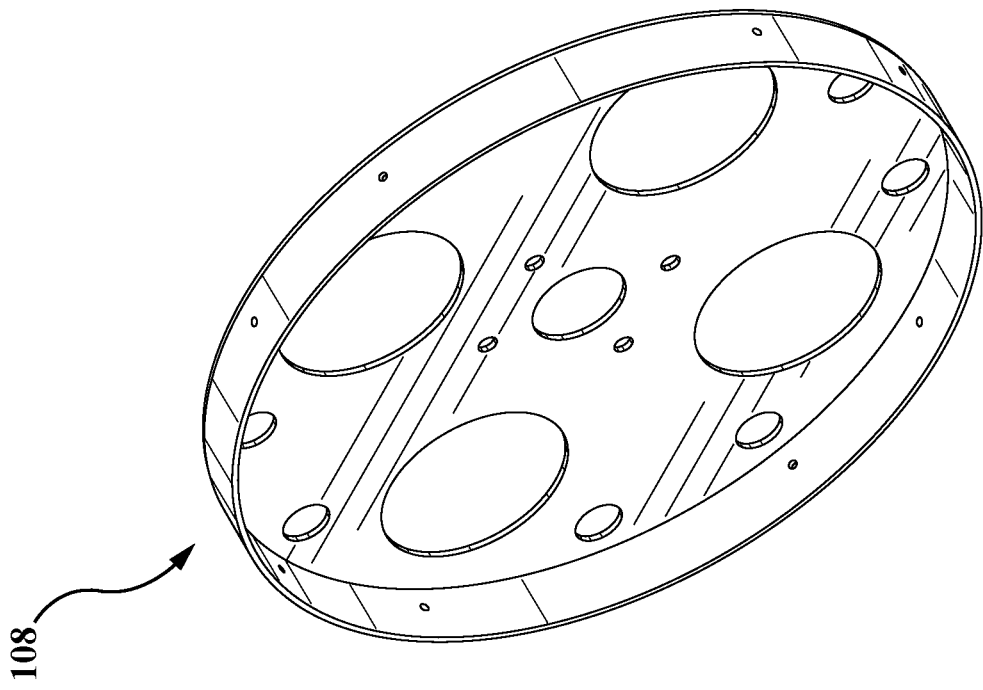
FIG. 15 is an illustration of a second inner plate.
Figure 18:
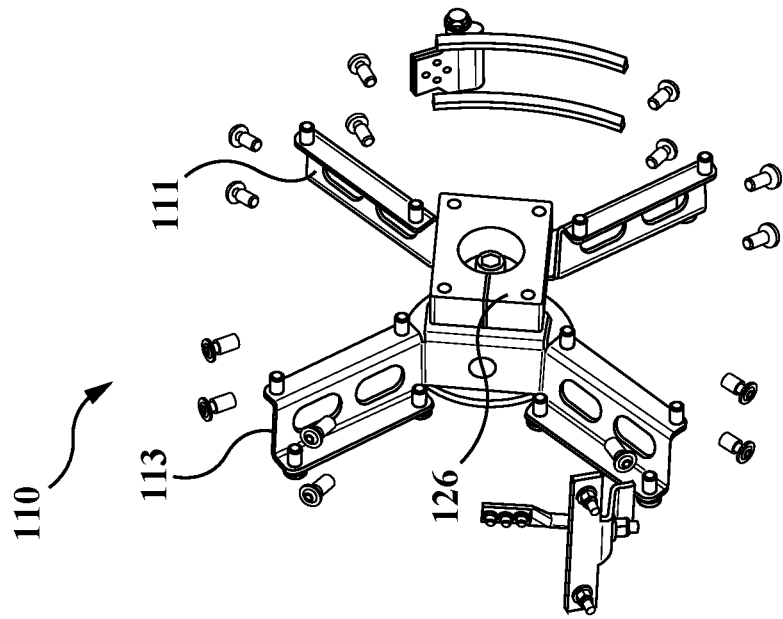
FIG. 18 is an illustration of a truss assembly with a neck mount.

The first neck mount 126 can be coupled to a first inner plate 106 and the second neck mount 128 can be coupled to a second inner plate 108. The first inner plate 106 is shown in more detail in FIGS. 9-11 and the second inner plate 108 is shown in more detail in FIGS. 15-16. The first inner plate 106 can include one or more apertures and/or a center aperture for the neck 606 of the container 102 as well as the first neck mount 126 and at least one of a valve, pressure release device, a tubing, a connector, etc. The second inner plate 108 can further include apertures and/or a center aperture for the second end 604 of the container as well as the second neck mount 126 and at least one of a valve, pressure release device, a tubing, a connector, etc. The material stored or housed in the container 102 can be delivered to the vehicle or an engine of the vehicle via one or more valves, connectors, tubing, etc. Moreover, the container 102 can be filled with the material via a valve, tubing, connectors, etc.

The first inner plate 106 can have a thickness and include a front side 138, a backside, and a sidewall 130 that is in contact with an inside wall of the housing 104. Further, the second inner plate 108 can have a thickness and include a front side, a backside, and a sidewall 132, wherein the sidewall 132 is in contact with an inside wall of the housing 104. It is to be appreciated that the sidewall 130 and the sidewall 132 can be coupled to the inside wall of the housing 104 with at least one of a welding, adhesive, screw, nut/bolt, threading, or a combination thereof. The back side of the first inner plate 106 can be in contact with and coupled to the first neck mount 126. The back side of the second inner plate 106 can be in contact with and coupled to the second neck mount 128.

Figure 7:
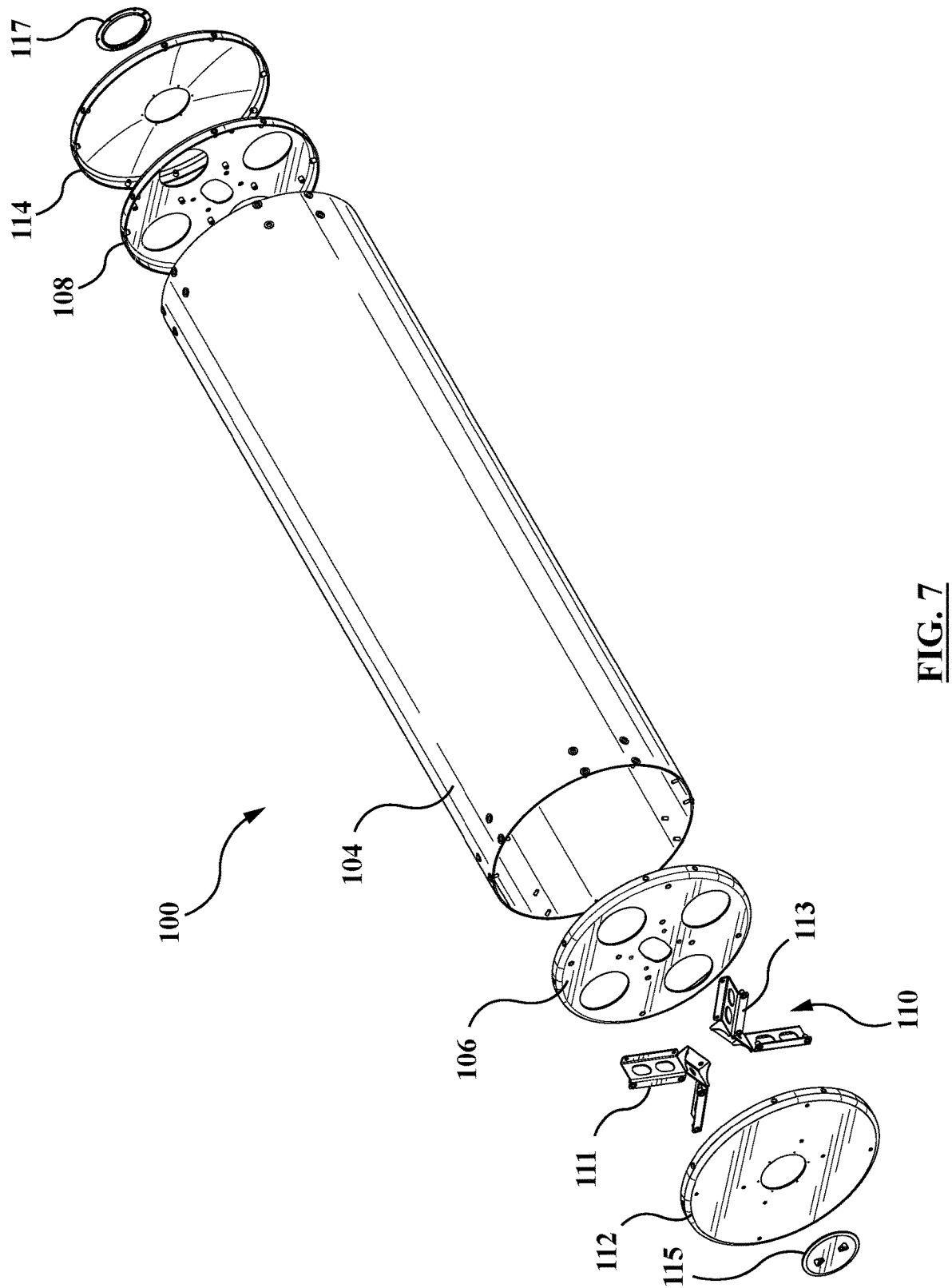
FIG. 7 is an exploded view of a housing, first inner plate, second inner plate, truss assembly, first shield plate, second shield plate, and end caps.
Figure 8:
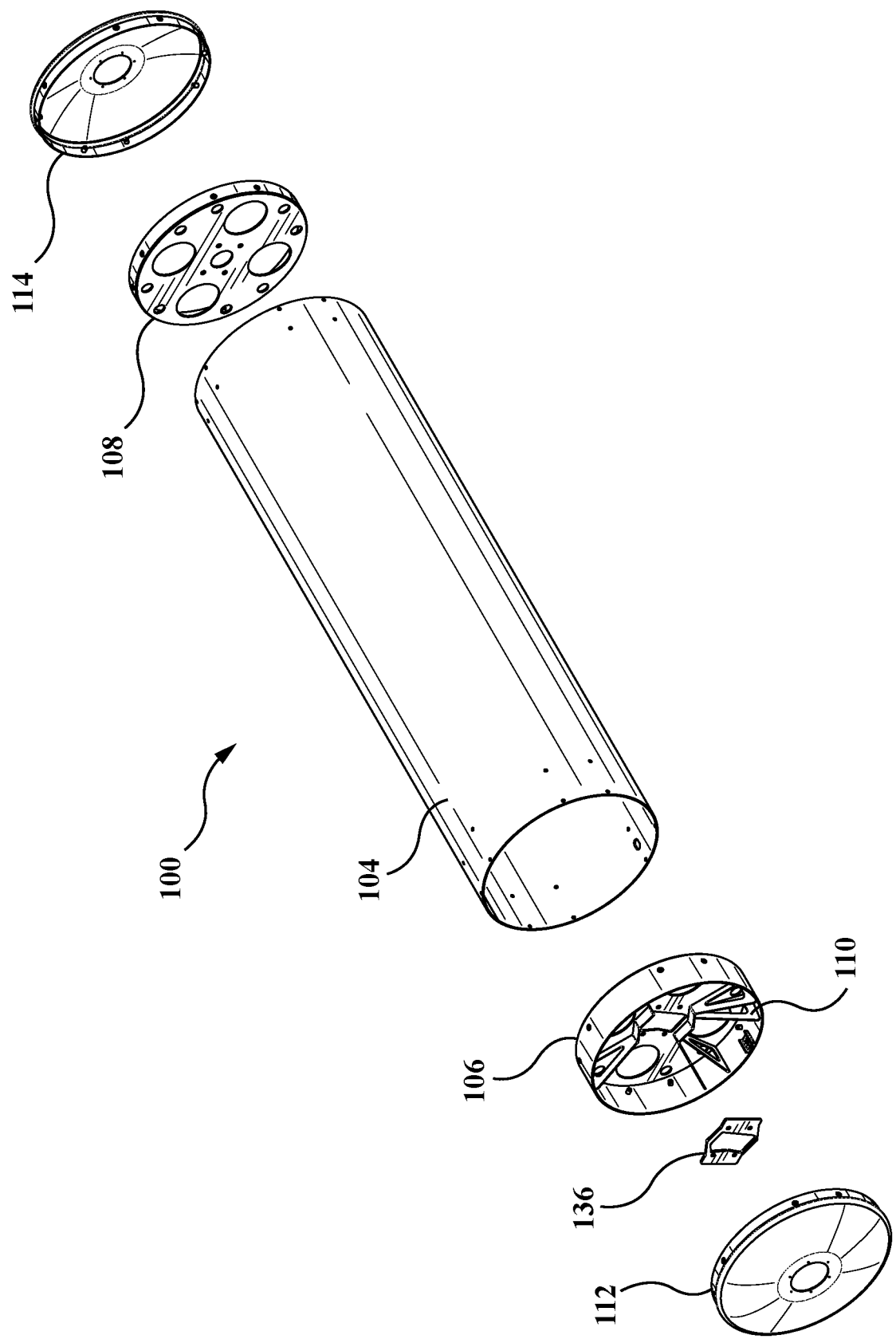
FIG. 8 is an exploded view of a housing, first inner plate, second inner plate, truss assembly integrated into the first inner plate, first shield plate, and second shield plate.

FIGS. 7 and 8 are exploded views of embodiments of the subject innovation. In particular, FIGS. 7 and 8 illustrate the housing 104, the first inner plate 106, the second inner plate 108, a truss assembly 110, the first shield plate 112, the second shield plate 114, a first end cap 115, and a second end cap 117. It is noted that FIGS. 7 and 8 do not illustrate the container 102 that is encased and protected by the housing 104.

The truss assembly 110 can be coupled to the front side 138 of the first inner plate 106, wherein the front side 138 is opposite the back side of the first inner plate 106 and is coupled to the first neck mount 126. In another embodiment, the support system 100 can include a first truss assembly 110 coupled to the first inner plate 106 and a second truss assembly coupled to a second truss assembly coupled to the second inner plate 108.

In an embodiment, the truss assembly 110 can be included on the first inner plate 106, the second inner plate 108, or a combination thereof. In another embodiment, the first inner plate 106 or the second inner plate 108 can be excluded within the support system 100 (and in particular within the housing 104) but can include the truss assembly 110 on one or more ends of the housing 104.

It is to be appreciated that the truss assembly 110 can be releaseably coupled to the first inner plate 126 as illustrated in FIG. 7. Turning to FIGS. 18-24, the truss assembly 110 is illustrated. For instance, the truss assembly 110 can include a first portion 111 and a second portion 113. In an embodiment, the truss assembly 110 can include a first portion 111 and a second portion 113 as separate components but can also be included as a single component without departing from the scope of the subject innovation. The first portion 111 can include a mount member with two (2) extending arms, wherein the mount member can be coupled to at least one of the first inner plate 106, the first neck mount 126, or the first shield plate 112. The two extending arms of the first portion 111 can be coupled to at least one of the first inner plate 106, the first neck mount 126, or the first shield plate 112. Similarly, the second portion 113 can include a mount member with two (2) extending arms, wherein the mount member can be coupled to at least one of the first inner plate 106, the first neck mount 126, or the first shield plate 112. The two extending arms of the second portion 113 can be coupled to at least one of the first inner plate 106, the first neck mount 126, or the first shield plate 112. It is to be appreciated that the truss assembly 110 can include apertures for structural integrity as well as to reduce weight thereof.

In an embodiment in which a truss assembly can be included on the second end 604 of the container 102 and the second end 103 of the housing and such coupling to can be similar to the truss assembly 110 discussed above without departing from the scope of the subject innovation.

Figure 11:
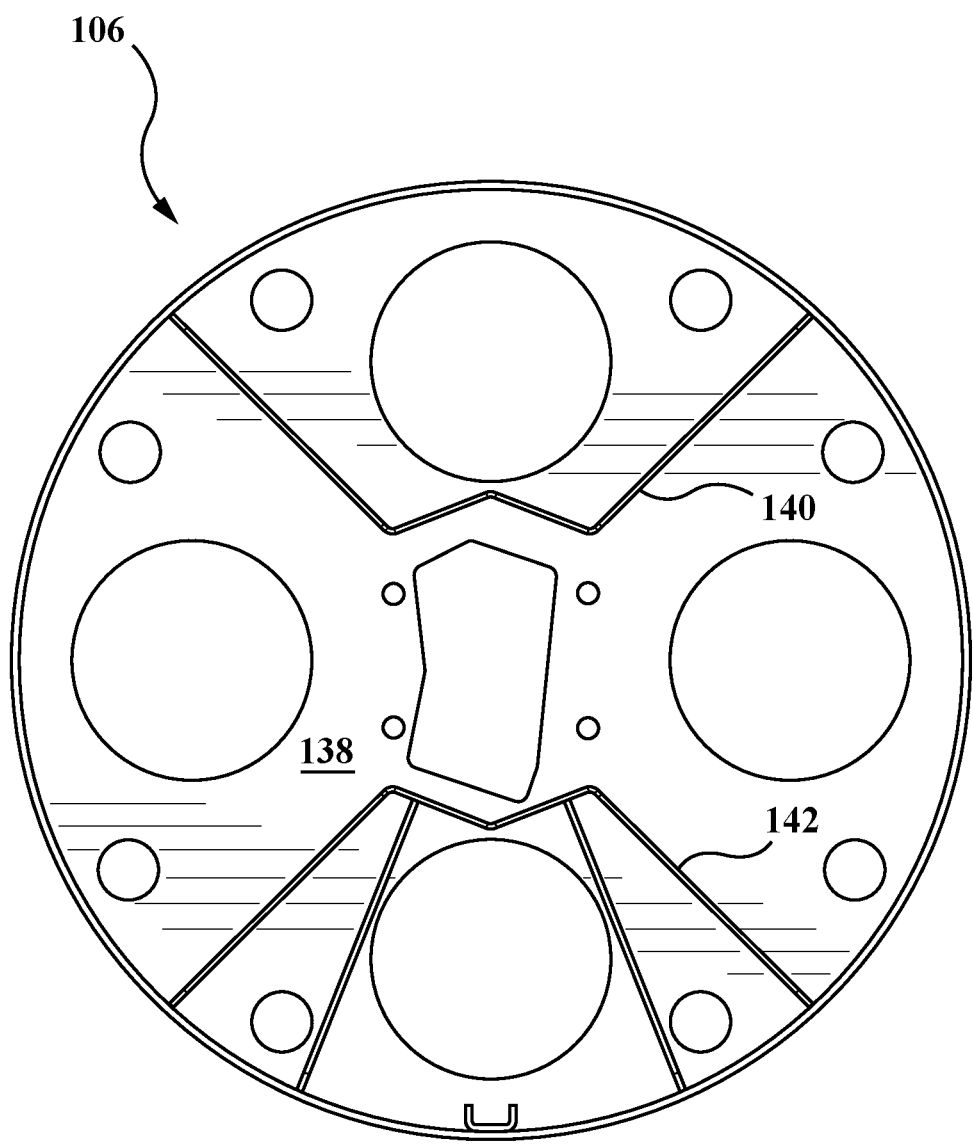
FIG. 11 is an illustration of a first inner plate.

Further, it is to be appreciated that the truss assembly 110 can be coupled directly to the first inner plate 106 with one or more welds as illustrated in FIG. 8. For instance, the truss assembly 110 can be integrated into the first inner plate 106. The truss assembly 110 coupled to the first inner plate 106 is illustrated in more detail in FIGS. 9-11. The truss assembly 110 can include a first gusset 140 and a second gusset 142. It is to be appreciated that the truss assembly 110 can include one or more gussets, wherein each gusset is a separate component or aggregated to be a single component. FIG. 11 illustrates angles associated with the first gusset 140 and the second gusset 142. The first gusset can be a "W" shape or can be selected with a shape with sound engineering without departing from scope of the subject innovation. The second gusset can be a "W" shape with two additional features within the outer arms of the existing "W" shape.

Figure 13:
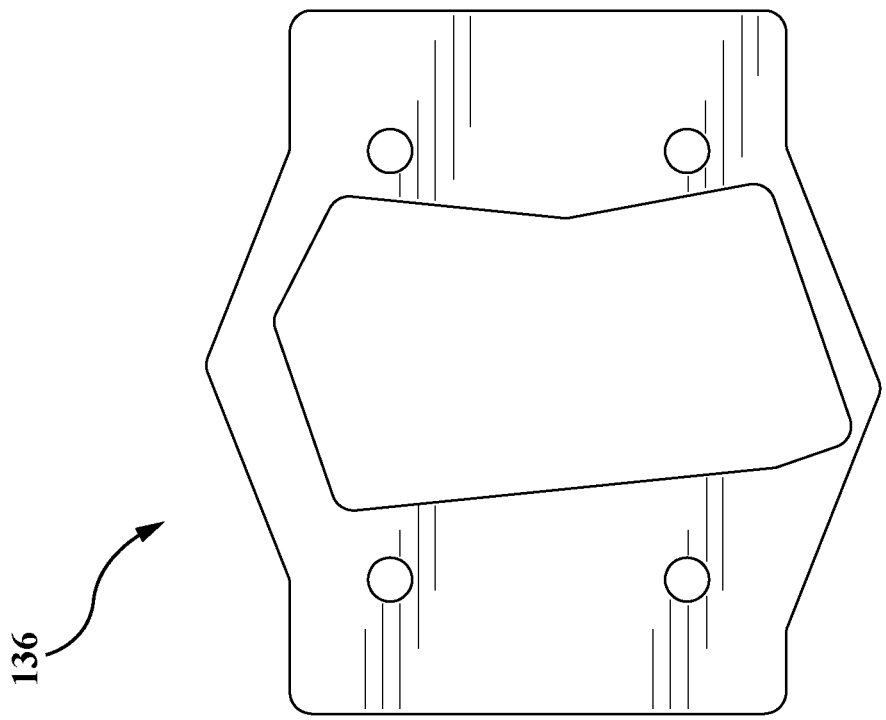
FIG. 13 is an illustration of a reinforcement plate.
Figure 12:
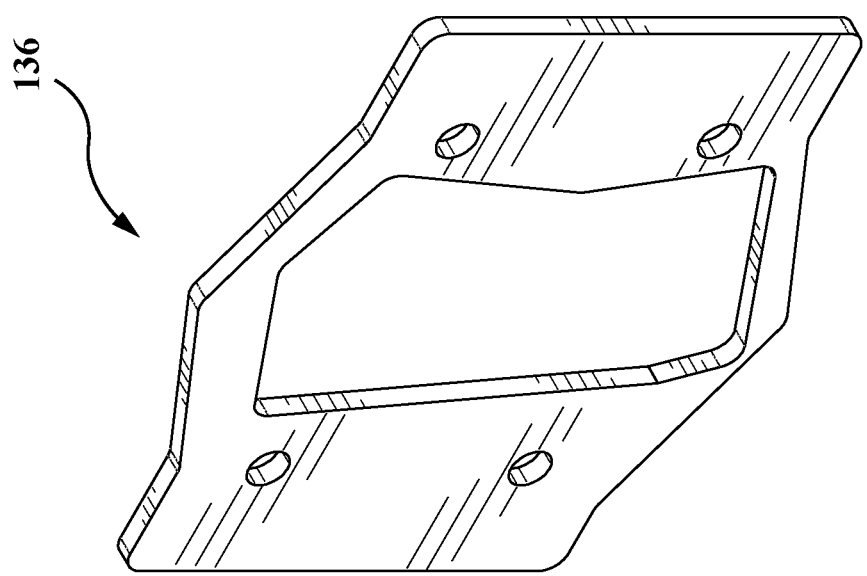
FIG. 12 is an illustration of a reinforcement plate.
Figure 14:
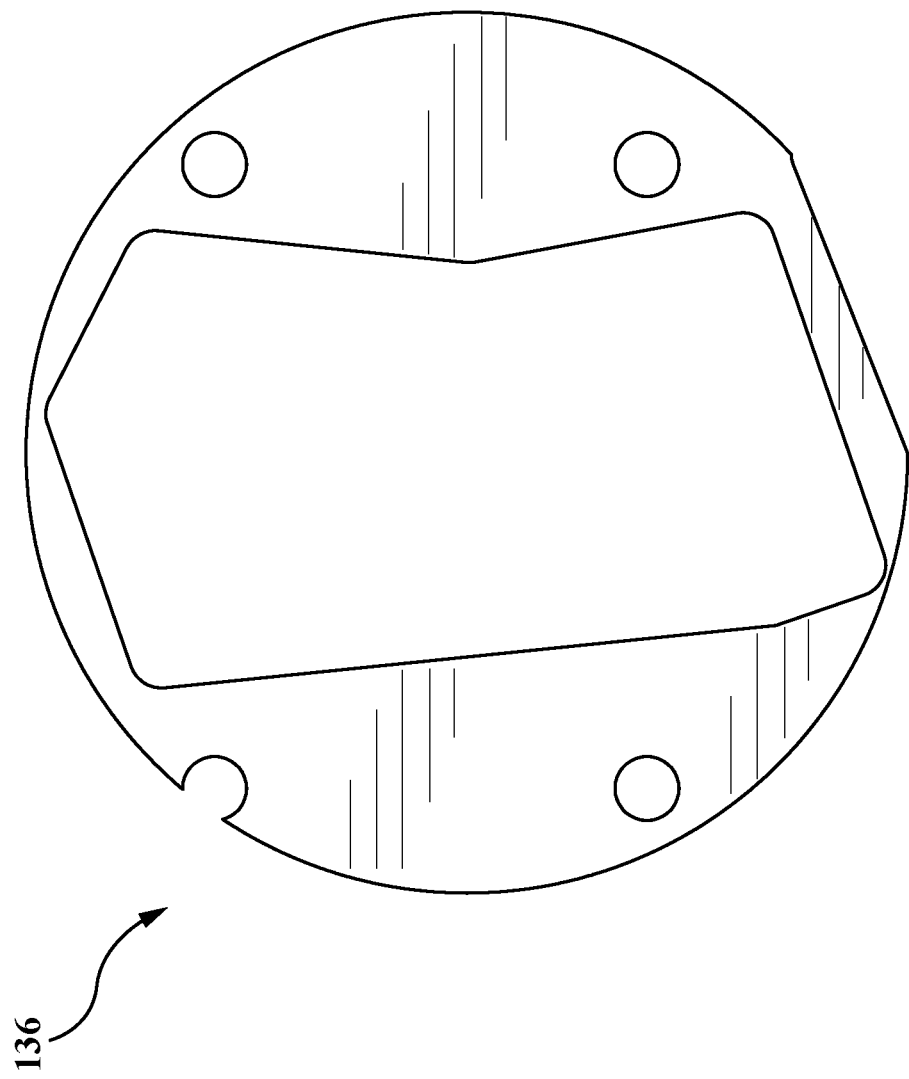
FIG. 14 is an illustration of a reinforcement plate.

Continuing with the embodiment illustrated in FIG. 8, a reinforcement plate 136 is coupled on the front side of the first inner plate 106, wherein the reinforcement plate 136 is illustrated in FIGS. 12-14. The reinforcement plate 136 can include one or more apertures for coupling as well as an aperture for at least one of the neck 606, a valve, a tubing, a connector, among others.

The support system 100 can further include a pressure release device (PRD). A PRD is a device adapted to sense one or more physical parameters, such as, without limitation, pressure, temperature, or stress, within or around a container 102 and to vent the contents of the container 102 to environment if the one or more physical parameters meet a predetermined standard. In one embodiment a PRD may be adapted to sense pressure within a container 102 and to vent the contents of the container 102 to environment if the pressure is more than some predetermined pressure. In some non-limiting embodiments, the predetermined pressure may be 50% of the maximum pressure a container 102 may contain without bursting or otherwise failing.

The support system 100 is a non-limiting embodiment that includes one or more containers 102 that are configured to house a material, each container 102 may be cylindrical in shape with a length, a diameter, and the first end 602 opposite a second end 604 in which the one of the ends can include at least one of a valve or a PRD.

It should be understood that in other acceptable embodiments the orientation of the one or more containers 102 need not be horizontal; the containers 102 may be vertical or in some other orientation or position in between a horizontal position and a vertical position (e.g., an angle between 0 and 90 degrees), such as, without limitation, slanted.

As discussed, the container can be neck mounted, that is mounted at one or more necks of the container 102. It is to be appreciated that the container 102 can include a neck on at least one end of the container 102. A neck mount provides for substantially stress free container expansion and/or contraction. A neck mount may comprise a mounting block having an internal geometry adapted to engage with the neck of a container 102 and an external geometry adapted to engage with a block receiver. In particular, a face of the first neck mount can be coupled to the first inner plate and a face of the second neck mount can be coupled to the second inner plate.

It should be understood that the internal geometry of the mounting block can be adapted to accept a wide variety of shapes of a neck including, but not limited to, cylindrical, cuboid, prismatic, polyhedral, or otherwise. It should be understood that the external geometry of the mounting block and the block receiver can be any of a wide variety of shapes including, but not limited to, cylindrical, prismatic, or otherwise. It should be understood that the fit between the neck of container 102 and the internal geometry of mounting block may be a tight fit or press fit or other fit adapted to prevent slippage between the neck and the internal geometry, or may be a loose or clearance or other fit adapted to permit slippage between the neck and the internal geometry.

It is further to be appreciated that a neck mount can be used on each end of the container 102 for each container 102 used in support system 100.

Figure 33:
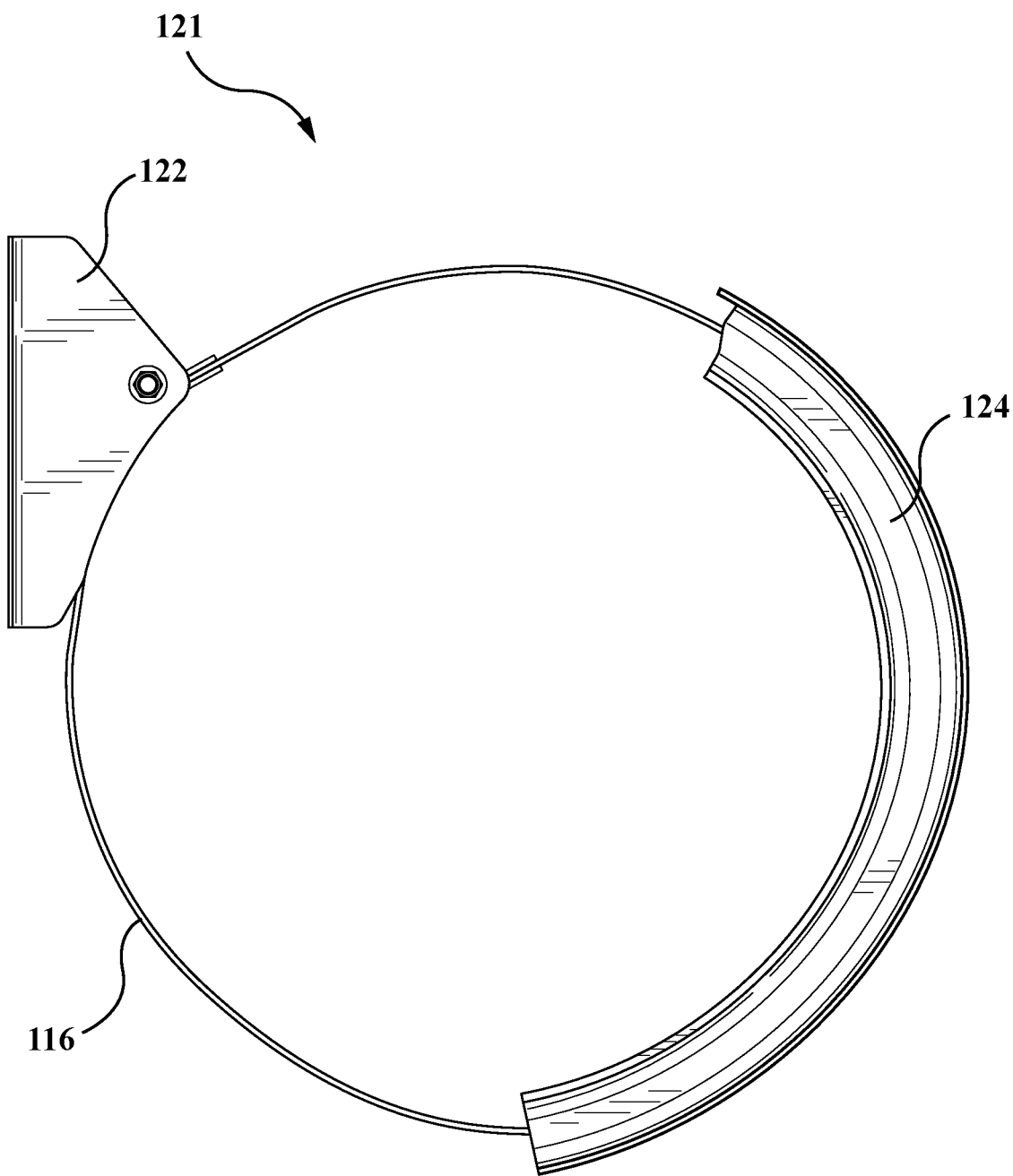
FIG. 33 is an illustration of a bracket assembly.

Turning now to FIGS. 30-36, the bracket assembly 121 is illustrated with various arrangements of the coupling member 122, one or more curved members 124, and/or one or more straps are depicted in accordance with one or more embodiments. For instance, in FIG. 32, the bracket assembly 121 includes a coupling member 122 attached to a strap 116 configured to loop around and secure a tank. According to another aspect, as depicted in FIG. 33, the bracket assembly 121 can include a coupling member 122 attached to a strap 116 which carries a curved member 124. The curved member 124 can provide a rigid support for a tank and operates with the strap 116 to secure the tank. In one example, the curved member 124 attaches to the coupling member 122 via a single strap 116 that loops through the curved member 124. In another example, the coupling member 122 couples to the curved member 124 via two straps 116 respectively attached to each end of the curved member 124.

Figure 34:
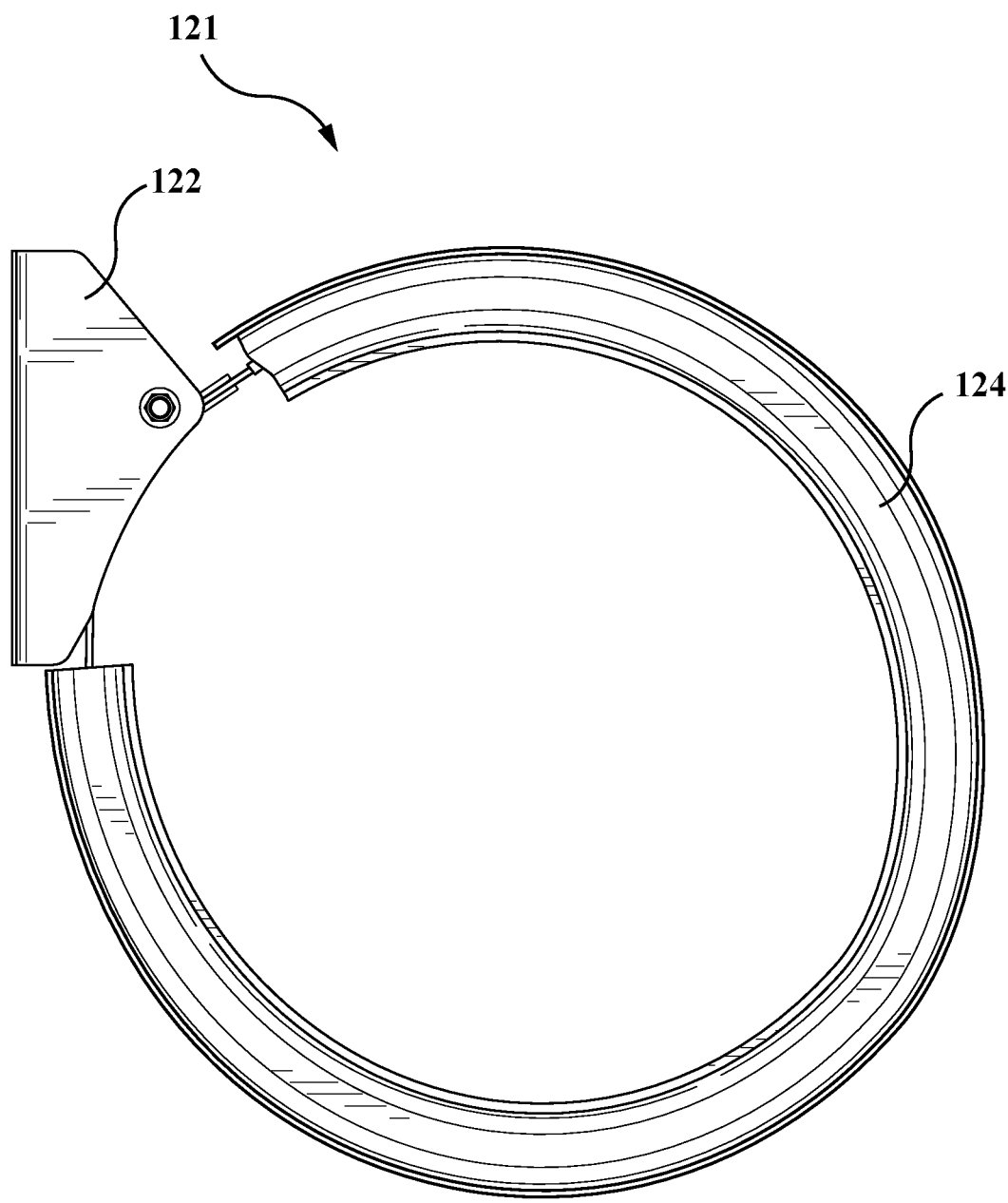
FIG. 34 is an illustration of a bracket assembly.
Figure 35:
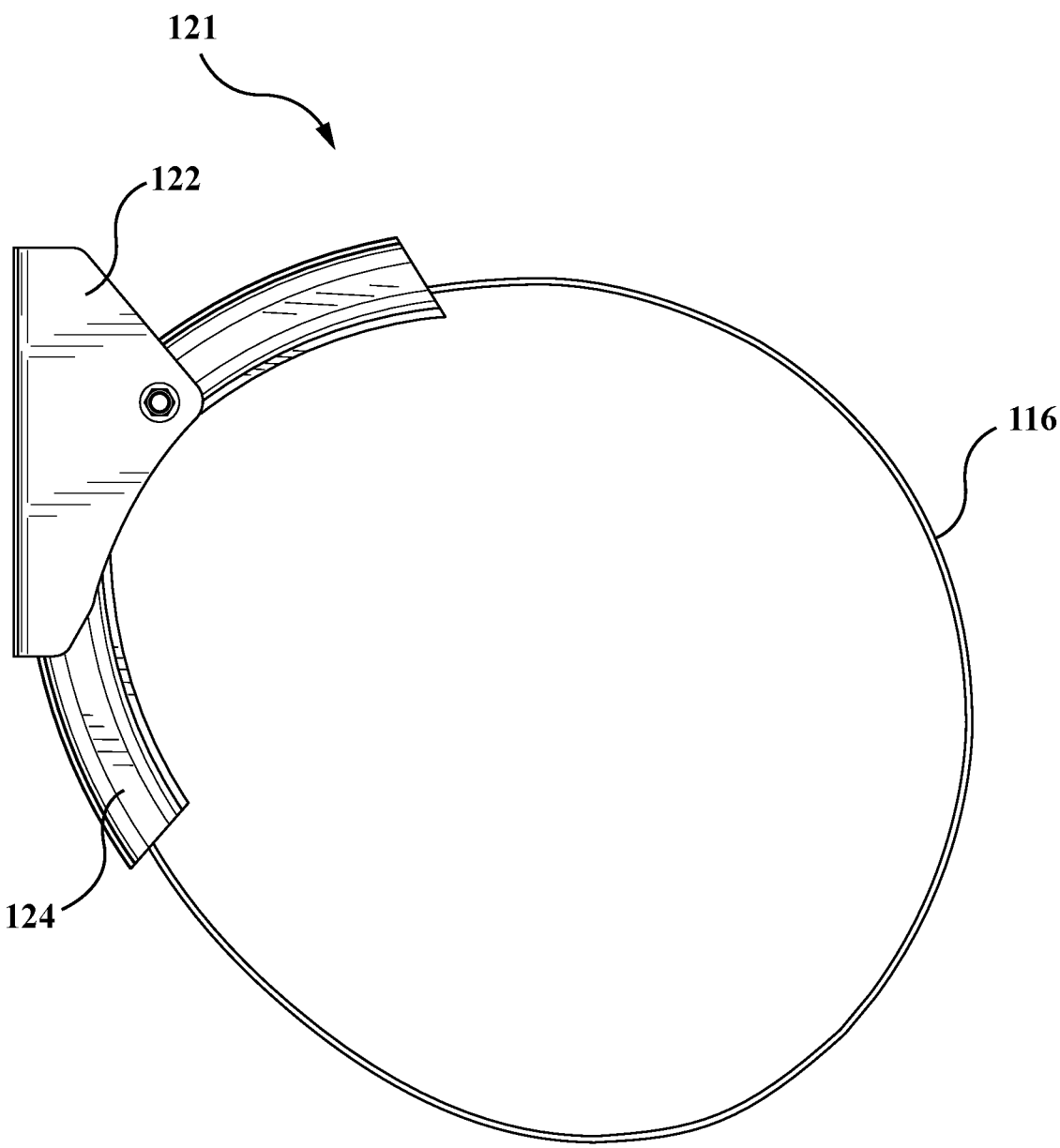
FIG. 35 is an illustration of a bracket assembly.
Figure 36:
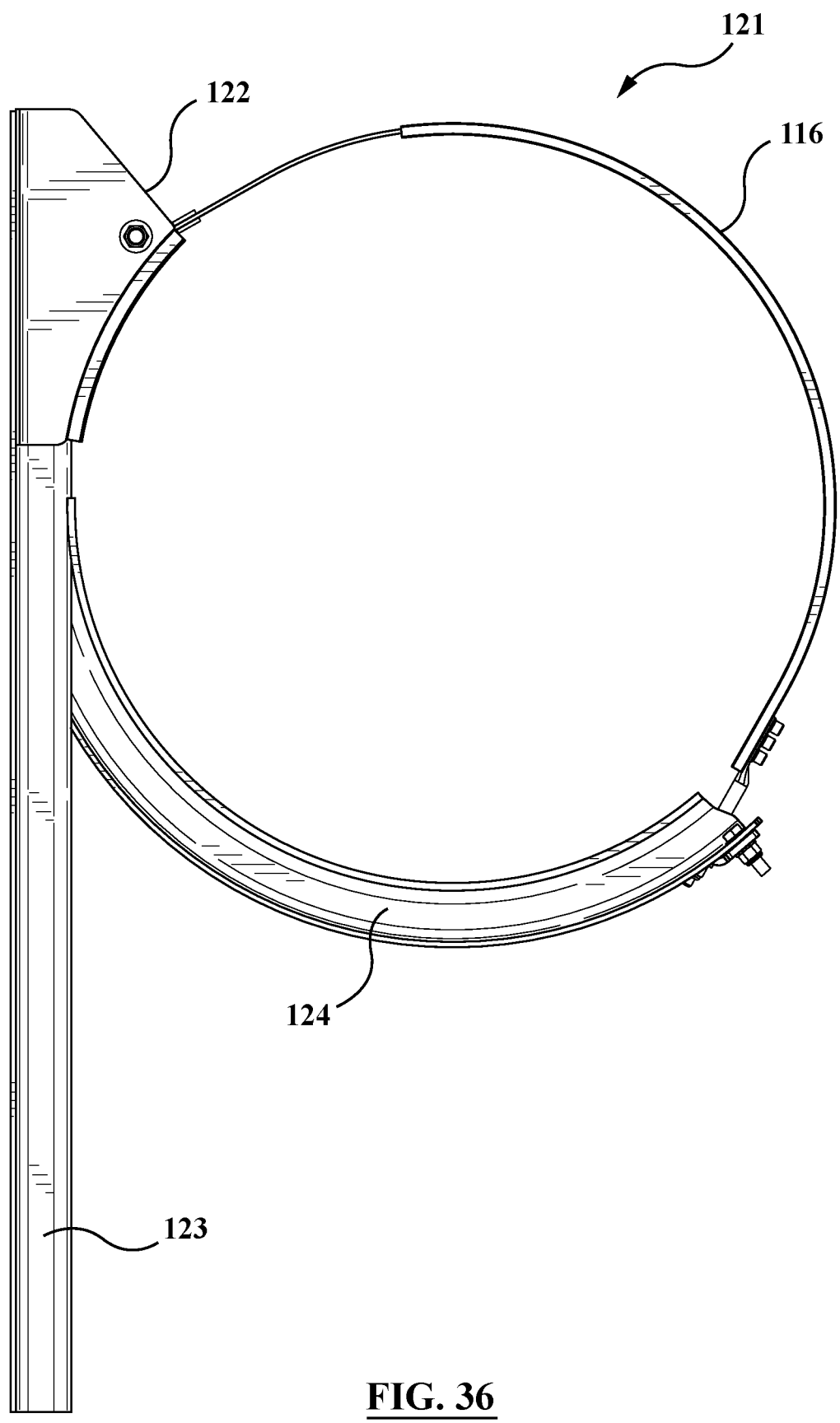
FIG. 36 is an illustration of a bracket assembly.

In yet another example, as shown in FIG. 34, the coupling member 122 couples to one or more curved members 124 to form a loop for securing a tank. The one or more curved members 124 can attach directly to the coupling member 122 or, alternatively, can attach to the coupling member 122 via one or more straps 116 or portions thereof. Further, it is to be appreciated, for example, that one end of the loop can include the curved member 124 directly attached to the coupling member 122, while the other end of the loop attaches the curved member 124 to the coupling member 122 via a strap 116 or portion thereof. According to another aspect depicted in in FIG. 35, the curved member 124 mounts to the coupling member 122 at a point of an arc of the curved member 124 located between the ends of the curved member 124. The ends of the curved member 124 can couple to a strap 116 configured to loop around and secure a tank. In yet another example, the bracket assembly 121 illustrated in FIG. 36 includes a coupling member 122 having an elongated extension member 123. The curved member 124 attaches to the coupling member 122, at one end for example, and further attaches to a strap 116 at another end. The strap 116, in turn, couples to the coupling member 122 thereby forming a loop for securing a tank. The extension member 123 can extend from the coupling member 122 in a direction below or above the coupling member 122, and substantially tangential to the loop, to provide an extended mounting surface.

As seen in FIGS. 37-39, the support system 100 can mount to a structure on a vehicle 200 or a portion of the vehicle. In an embodiment, the support system 100 can be coupled to the chassis or frame 118 of the vehicle 200. For example, as shown in FIGS. 37 and 38, the support system 100 can be mounted to a portion of a cabin 202 of the vehicle in a horizontal orientation compared to a ground level (FIG. 37). In another example, the support system 100 can be mounted to a portion of a cabin 202 of the vehicle in a vertical orientation compared to a ground level (FIG. 38). It is to be appreciated the vehicle 200 can include one or more support systems 100 in various configurations (e.g., first support system in a horizontal orientation and a second support system in a vertical orientation, or a support system in a position that is in between horizontal and vertical). In another example, illustrated in FIG. 39, the support system 100 can be mounted to the chassis or frame 118 so that the container 102 within the housing 104 can be supported beside or beneath the frame 118.

At least one of the straps 116 or the housing 104 can be configured to receive an entry step to allow a user to enter/exit a door of the vehicle. In particular, a step bracket or a step can be coupled to a portion of one or more of the straps 116. In another example, a portion of a step bracket or a step can be coupled to a portion of the housing 104. At least one of the entry step, the entry step bracket, or the housing 104 can be designed to be affixed with aerodynamic fairing packages or aerodynamic features to aid in aerodynamics.

In certain embodiments, the support system 100 includes an electrical connector component that couples to at least one of an electrical component of the vehicle. For example, and without limitation, in conventional vehicles, there is typically an electrical system comprising one or more of an alternator or other electrical generator and a battery or other energy storage device adapted to supply electrical energy. Known methods and apparatuses for operationally engaging the electrical system of a vehicle may be adapted for use with system 100 in order to provide an electrical connector component that may be used to readily couple with the electrical system of vehicle. An electrical connector component coupled with the electrical system of vehicle may be used to supply the support system 100 with electrical energy.

In certain embodiments, the support system 100 includes a fuel connector component adapted to fluidly communicate with at least one of a hose of the vehicle or a fuel line of the vehicle, wherein the fuel connector component is adapted to output of a portion of the material from the one or more containers 102 to a portion of an engine of the vehicle. Moreover, supply lines or conduit can be used to deliver a material stored in the container to an engine or area of the engine in the vehicle.

The system 100 can utilize one or more manifolds, and in particular, a first manifold on a driver side of the vehicle and a second manifold on a passenger side of the vehicle. In such embodiments, first manifold may comprise a fast-fill port adapted to receives a portion of the material contained within one or more containers 102 at a first rate of flow; a fuel transfer port configured for fluid communication of a portion of the material between a container affixed to a second vehicle and the one or more containers 102 of the first vehicle and also configured for fluid communication of a portion of the material between the one or more containers 102 of vehicle and an external storage container (not integral to the vehicle) such as, without limitation, a storage container at a garage, depot, or other site; and a transfer valve that is configured to control flow for the fuel transfer port. The manifold can include a shut-off valve, an internal check valve, an inlet fitting, a fuel storage fitting, a coalescing filter, and a pressure gage. In certain embodiments, a first container is in selectable fluid communication with a second container. This latter selectable fluid communication may adapted for control by a valve.

Generally, a container 102 may be any kind of container chosen with good engineering judgment and may, without limitation, consist of or comprise a cylinder, a tank, a housing, or a canister. The vehicle may be any kind of vehicle chosen with good engineering judgment and may, without limitation, be selected from the group consisting of a semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, and the like.

It is to be appreciated that the support system 100 can include one or more containers 102. For instance, a vehicle can include a first container on a driver side and a second container on the passenger side, wherein the first container and the second container are horizontal in comparison to the ground and at a level at or below the chassis of the vehicle. In a particular embodiment, a weight element can be used as a counterweight or a counterbalance in the event that a configuration of containers is used that requires balancing—for instance when a first container is used on one side but a second container is not on the opposite side. In such instance, a side can be configured to house a weight element that counterbalances a portion of weight associated with the container on the opposite side.

The support system 100 can include tubing that delivers the material from the container 102 to a manifold, an engine, or a portion of an engine of the vehicle, wherein the tubing can utilize one or more filters, connectors, valves, regulators, and the like.

The support system 100 can utilize a shock mount, wherein the shock mount can be, but is not limited to being, a elastomeric damper, a spring-damper, and the like. The shock mount can include a damper with an aperture in which a bolt can be inserted therein, wherein the bolt can attach a bracket assembly to the chassis of the vehicle. The shock mount can further include a washer or plate on an end with a nut that facilitates attachment to the chassis. In a horizontal orientation, the shock mount can include a mounting bracket which attaches bracket assembly to the chassis of the vehicle and also to the shock mount. The shock mount include the damper that mitigates impact or shock since it is between the bracket assembly.

In an embodiment, a support system is provided. In an embodiment, the housing further comprises a first shield plate that is coupled to the truss assembly. In an embodiment, the housing further comprises a second shield plate that is coupled to the second inner plate. In an embodiment, the curved member of the bracket assembly is positioned above the coupling member. In an embodiment, the curved member of the bracket assembly is positioned below the coupling member. In an embodiment, a strap is provided that secures the housing to the bracket assembly. In an embodiment, the strap includes a thickness, a first end and a second end opposite the first, wherein the strap is positioned around a circumference of the housing. In an embodiment, the first end is coupled to the coupling member and the second end is coupled to the curved member. In an embodiment, a valve is provided that allows the compressed gas to be filled into the container and dispensed from the container, the valve is located on the first end of the container. In an embodiment, a pressure release device is provided and is located on the second end of the container that is configured to release pressure from the container based on a parameter. In an embodiment, the container is cylindrical in shape and the housing is cylindrical in shape In an embodiment, a storage system is provided. In an embodiment, the material is a compressed natural gas. In an embodiment, the material is a compressed hydrogen. In an embodiment, a bracket assembly is provided that couples to the frame of the vehicle and supports a portion of the housing. In an embodiment, a strap is provided and includes a first end and a second end opposite thereto, wherein the first end is coupled to a first portion of the bracket assembly and the second portion is coupled to a second portion of the bracket assembly such that the strap is positioned around a circumference of the housing perpendicular to the length of the housing. In an embodiment, the bracket assembly includes a coupling member that couples to the frame and a curved member that support the portion of the housing, wherein the bracket assembly is shaped in a "J" shape.

In an embodiment, a support system is provided. In an embodiment, the following is provided: a first bracket assembly positioned proximate to the first end of the housing; a second bracket assembly positioned proximate to the second end of the housing; and a third bracket assembly positioned in-between the first bracket assembly and the second bracket assembly. In an embodiment, each respective bracket assembly is positioned between a steer axle and a drive axle of the vehicle In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system for a vehicle, comprising:
one or more bracket assemblies that are configured to support a container within a housing, the one or more bracket assemblies include a coupling member that couples to a chassis of a vehicle and a curved member that couples to the coupling member and directly supports a portion of the housing, wherein the container is configured to house a fuel for the vehicle; and
the housing is supported and secured by a portion of the bracket assembly and the housing configured to encase the container, a first neck mount and a second neck mount that couple to a first end of the container and the second end of the container respectively, a first inner plate, a second inner plate, and a truss assembly.

2. The system of claim 1, the first inner plate is secured to at least one of a portion of an inside wall of the housing or through the inside wall of the housing.

3. The system of claim 1, the second inner plate is secured to at least one of a portion of an inside wall of the housing or through the inside wall of the housing.

4. The system of claim 1, the curved member of the bracket assembly is positioned above the chassis.

5. The system of claim 1, the curved member of the bracket assembly is positioned below the chassis.

6. The system of claim 1, further comprising one or more straps that secure the housing to a portion of the bracket assembly.

7. The system of claim 6, the one or more straps each include a thickness, a first end and a second end opposite the first, wherein the strap is positioned around a portion of a circumference of the housing.

8. The system of claim 7, wherein the first end is coupled to the coupling member and the second end is coupled to the curved member.

9. The system of claim 1, wherein the fuel is at least one of a compressed gas or a renewable fuel source.

10. A system for a vehicle, comprising:
a housing having a first end and a second end opposite the first end and a thickness, the housing having a length between the first end and the second end creating a wall of the housing, the housing is configured to provide protection and enclose a container that stores a material to fuel an engine of the vehicle, a first neck mount and a second neck mount that secure the container, and a truss assembly;
the container having a first end and a second end opposite thereto, wherein the first end and the second end are secured to at least one of an inside of the wall of the housing or through the inside wall of the housing; and
one or more bracket assemblies that are configured to support the housing, the one or more bracket assemblies include a coupling member that couples to a frame of the vehicle and a curved member that couples to the coupling member and directly supports a portion of the housing;
wherein the housing is configured to be removeabley coupled to a frame of a vehicle such that the length of the housing is at least one of behind a cab of the vehicle or below a cab of the vehicle.

11. The system of claim 10, further comprising a truss assembly that is coupled to between at least one of the first end of the container or the second end of the container.

12. The system of claim 10, wherein the material is a compressed natural gas or a compressed gas.

13. The system of claim 10, wherein the material is compressed hydrogen.

14. The system of claim 13, further comprising a strap that is configured to couple to a portion of the bracket assembly, a portion of the strap is positioned around a circumference of the housing perpendicular to the length of the housing.

15. The system of claim 10, the first end or the second end of the container includes a neck and one or more valves, wherein the one or more valves are configured to at least one of receive the material or deliver the material to a vehicle via a tubing.

16. A system, comprising:
a housing having a first end and a second end opposite the first end and a thickness, the housing having a length between the first end and the second end creating a wall of the housing, the housing encases a container that stores a portion of a fuel;

the housing configured to provide protection and enclose the container, a first neck mount and a second neck mount that secure the container, and a truss assembly; and one or more bracket assemblies, wherein each bracket assembly includes a coupling member that couples to a chassis of a vehicle and a curved member that is coupled to the coupling member and directly supports or couples to an exterior portion of the housing.

17. The system of claim 16, the one or more bracket assemblies include:

a first bracket assembly positioned proximate to the first end of the housing;

a second bracket assembly positioned proximate to the second end of the housing; and a third bracket assembly positioned at a location between the first bracket assembly and the second bracket assembly.

18. The system of claim 16, the one or more bracket assemblies are positioned between a steer axle and a drive axle of the vehicle.

\* \* \* \* \*